(12) United States Patent
Knight

(10) Patent No.: US 7,082,750 B2
(45) Date of Patent: Aug. 1, 2006

(54) PRESSURIZER FOR A ROCKET ENGINE

(76) Inventor: Andrew F. Knight, 1111 Arlington Blvd. #317, Arlington, VA (US) 22209

( * ) Notice: Subject to any disclaimer, the term of this patent is extended or adjusted under 35 U.S.C. 154(b) by 320 days.

(21) Appl. No.: 10/629,685

(22) Filed: Jul. 30, 2003

(65) Prior Publication Data

US 2004/0148925 A1 Aug. 5, 2004

Related U.S. Application Data

(63) Continuation-in-part of application No. 10/214,706, filed on Aug. 9, 2002, now Pat. No. 6,751,945.

(51) Int. Cl.
F02F 9/00 (2006.01)
F02F 9/42 (2006.01)
F02F 9/72 (2006.01)

(52) U.S. Cl. .................. 60/259; 60/257; 417/393; 417/401

(58) Field of Classification Search .......... 60/259, 60/257, 211, 39.45; 417/401, 392, 393, 395, 417/137
See application file for complete search history.

(56) References Cited

U.S. PATENT DOCUMENTS

| | | | |
|---|---|---|---|
| 2,505,798 A | | 5/1950 | Skinner |
| 2,701,441 A | | 2/1955 | Mitchell |
| 2,898,735 A | * | 8/1959 | Carmody et al. .............. 60/215 |
| 3,213,804 A | * | 10/1965 | Sobey ........................ 417/347 |
| 3,283,508 A | * | 11/1966 | Schulze ........................ 60/223 |
| 3,302,406 A | * | 2/1967 | Braue, Jr. ..................... 60/257 |
| 3,350,886 A | * | 11/1967 | Ferand et al. ................. 60/204 |
| 3,367,271 A | * | 2/1968 | Wilson ........................ 417/401 |
| 3,400,536 A | * | 9/1968 | Richardson ................ 60/39.48 |
| 3,945,203 A | | 3/1976 | Kayser |
| 4,880,185 A | | 11/1989 | Apfel |
| 5,205,722 A | | 4/1993 | Hammond |
| 5,471,833 A | | 12/1995 | Pahl |
| 5,582,001 A | * | 12/1996 | Bradford et al. .............. 60/251 |
| 5,839,463 A | | 11/1998 | Blackmon |
| 5,961,074 A | * | 10/1999 | Dunn ..................... 244/135 R |
| 6,213,348 B1 | | 4/2001 | Le Grouyellec |
| 6,314,978 B1 | | 11/2001 | Lanning |
| 6,325,159 B1 | * | 12/2001 | Peterman et al. .............. 175/7 |
| 6,499,288 B1 | * | 12/2002 | Knight ........................ 60/211 |
| 6,505,691 B1 | * | 1/2003 | Judge et al. .................. 175/70 |
| 6,751,945 B1 | * | 6/2004 | Knight ........................ 60/259 |

OTHER PUBLICATIONS

Steve Harrington, "Pistonless Dual Chamber Rocket Fuel Pump", AIAA-LA Section/SSTC Responsive Space Conference 2003-6003.
J. C. Whitehead, "Mars Ascent Propulsion Options for Small Sample Return Vehicles", Jul. 1997, AIAA 97-2950.
J. C. Whitehead et al, Pumped Hydrazine Miniaturized Propulsion System; Jul. 1989, AIAA 89-2958.
J. C. Whitehead, "Free Piston Pumps for Miniature Rocket Propulsion", Jun. 1991, AIAA 91-1837.

(Continued)

Primary Examiner—William H. Rodriguez

(57) ABSTRACT

A pressurizer for pressurizing a fluid includes: at least two storage tanks, where, for each storage tank, the pressurizer further includes: a propellant entrance valve, a propellant exit valve, a pressurant entrance valve, and a pressurant exit valve, where each of the storage tanks is configured to be filled with the fluid under a low pressure when its propellant entrance and pressurant exit valves are open and its propellant exit and pressurant entrance valves are closed, and to be drained of the fluid under a high pressure by the force of a pressurant when its valves are reversed, where its valves are configured to be opened and closed in a cycle to sequentially fill and drain the storage tank of the fluid, the cycle having a cycle time of between 1 and 500 milliseconds, and where the cycles of the valves of the storage tanks are out of phase with each other such that at some time in which one storage tank is being filled with the fluid, at least one other storage tank is being drained of the fluid. The pressurizer may be used as a propellant pump in a rocket engine.

27 Claims, 18 Drawing Sheets

OTHER PUBLICATIONS

J. C. Whitehead, "Demand Thrust Pumped Propulsion with Automatic Warm Gas Valving", Jul. 1992, AIAA 92-3539.

J.C. Whitehead, "Test Results for a Reciprocating Pump Powered by Decomposed Hydrogen Peroxide," Jul. 2001, AIAA-2001-3839.

J.C. Whitehead, "Hydrogen Peroxide Gas Generator Cycle with a Reciprocating Pump", Jul. 2002, AIAA 2002-3702.

J.C. Whitehead et al, "Design and Flight Testing of a Reciprocating Pump Fed Rocket," Jun. 1994, AIAA 94-3031.

D.E. Eddleman et al, "Reciprocating Feed System for Advanced Space Propulsion Systems", Apr. 2004, AIAA Student Conference.

W. Hammack, "XCOR Aerospace Announces New Rocket Engine Pump Design", Apr. 27, 2002, www.xcor.com.

W. Hammack, "XCOR Passes Major Milestone on DARPA Piston Pump Contract", Sep. 26, 2003, www.xcor.com.

* cited by examiner

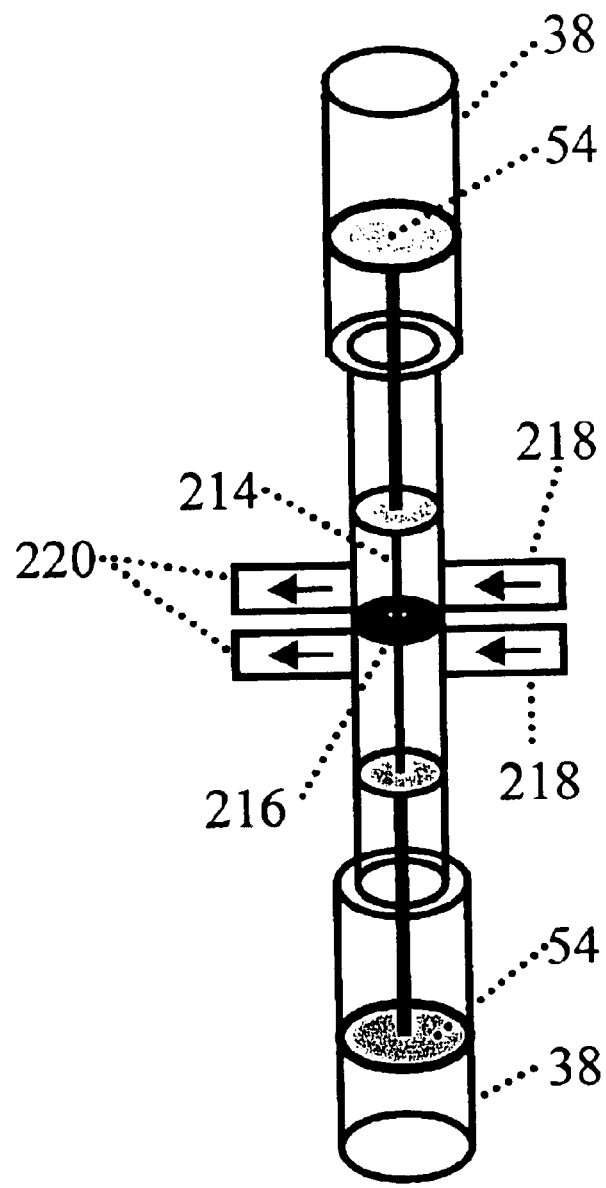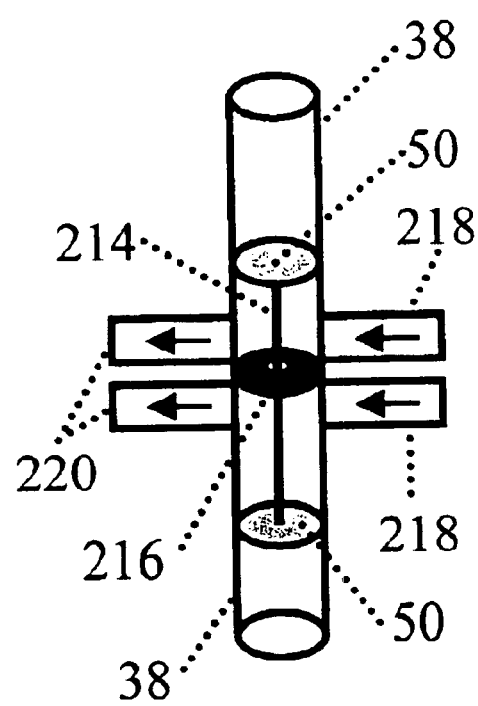
Fig. 17a
Fig. 17b

PRESSURIZER FOR A ROCKET ENGINE

REFERENCE TO RELATED APPLICATION

This application is a Continuation-in-Part (CIP) of U.S. application Ser. No. 10/214,706, entitled "Pressurizer For a Rocket Engine," filed Aug. 9, 2002. and issued as U.S. Pat. No. 6,751,945.

BACKGROUND

Rocket engines require propellants to be fed to them at very high pressures. This has historically been accomplished in two general ways: first, with the use of a pressurized fluid, such as high pressure helium; and second, with the use of a pump.

In the first way (e.g., a "blowdown" system), a pressurized fluid, such as helium, is added directly to the propellant tank and exerts a force on the propellant. The problem with this method, however, is that the pressurized fluid also exerts a force on the propellant tank. Because of the extremely high pressures required of the pressurized fluid, the walls of the propellant tank must be thick enough to withstand the pressure. The propellant tank is therefore very heavy. Rockets employing the pressurized fluid must use a greater proportion of their thrust lifting this extra weight, and therefore they are not as efficient as rockets that do not require this added weight.

Historically, one way to solve the above weight problem is with the use of a pump. Pumps (e.g., reciprocating, centrifugal, or radial pumps) are generally very complex and expensive and require their own driving means, such as an engine. Further, the engine driving the pump burns a significant percentage of the total propellant. For small rocket engine systems, since a pump is too complicated and too expensive, pressurized fluids are generally used to pressurize the propellant. However, for large rocket engine systems, pumps have the advantage that the walls of the propellant tank need not be thick, since there is little pressure in the tank. Therefore, the propellant tank is much lighter, and the added weight of the pump is more than offset by the reduction in propellant tank weight.

U.S. Pat. No. 3,213,804 to Sobey ("Sobey") discloses fluid pressure accumulators that are connected to sources of low and high pressure by means of valves. Essentially, the pressurized fluid exerts force on the propellant in small, designated storage tanks. While the walls of these containers must be thick in order to withstand the high pressure of the pressurized fluid, the walls of the propellant tank need not be. Therefore, the total weight of the rocket engine system employing Sobey's invention may be less than that of the previously discussed rocket engine system because these storage tanks (fluid pressure accumulators) are small in comparison to the propellant tanks.

U.S. Pat. No. 6,314,978 to Lanning, et al. ("Lanning") discloses a reciprocating feed system for fluids having storage tanks 1, 2, 3 that are similar in purpose to the fluid pressure accumulators disclosed in Sobey. Instead of valves 50, 52, 54 disclosed in Sobey, Lanning discloses four valves for each storage tank 1, 2, 3. For example, associated with storage tank 1 are: valve 13 between storage tank 1 and low pressure fluid 5; valve 16 between storage tank 1 and high pressure discharge 7; valve 20 between storage tank 1 and vent manifold 18; and valve 24 between storage tank 1 and pressurized gas supply 8. Each valve must be accurately and reliably controlled by a controller 11. Further, each valve may have an associated sensor 11a.

SUMMARY OF THE INVENTION

There are several problems with the Sobey and Lanning inventions. In order to reduce the weight of Sobey's (or Lanning's) device further, the sizes of the storage tanks must decrease (thus reducing their weight). However, as they decrease, both the system cycle time (the time to fully complete a filling and draining cycle of a storage tank) and the opening and closing time of the valves must decrease in order to accommodate the same propellant flow rate to the rocket engine. The system cycle time is limited both by the opening and closing time of the valves, as well as the time required to depressurize each of the storage tanks of high pressure pressurant before introducing the low-pressure propellant (otherwise, the high-pressure pressurant will push the low-pressure propellants in a undesirable backflow). Lanning discloses an achievable cycle time of around 4.5 seconds. However, neither Sobey nor Lanning addresses or discloses an apparatus or method for decreasing cycle time—and thus the mass of the system—by decreasing the opening and closing time of the valves or the time required to depressurize each of the storage tanks. The present invention aims to solve these and other problems.

In a preferred embodiment, the present invention provides for a pressurizer for pressurizing a fluid, comprising: at least two storage tanks, wherein, for each storage tank, said pressurizer may further comprise: a propellant entrance valve connected to and associated with said storage tank; a propellant exit valve connected to and associated with said storage tank; a pressurant entrance valve connected to and associated with said storage tank; and a pressurant exit valve connected to and associated with said storage tank, wherein each of said storage tanks is configured to be filled with said fluid under a low pressure when its associated propellant entrance and pressurant exit valves are open and its associated propellant exit and pressurant entrance valves are closed, and to be drained of said fluid under a high pressure by the force of a pressurant when its associated propellant entrance and pressurant exit valves are closed and its associated propellant exit and pressurant entrance valves are open, wherein, for each storage tank, its associated valves are configured to be opened and closed in a cycle to sequentially fill and drain their associated storage tank of said fluid, said cycle having a cycle time, wherein said cycles of said associated valves of said storage tanks are out of phase with each other such that at some time in which one storage tank is being filled with said fluid, at least one other storage tank is being drained of said fluid, and wherein said cycle time for each storage tank is between 1 and 500 milliseconds. In another aspect, the cycle time may be between 1 and 250 milliseconds, or between 1 and 100 milliseconds.

In another preferred aspect, each of said associated valves of each of said storage tanks may have an open time, which is the time required for the valve to move from a fully closed position to a fully open position, and a close time, which is the time required for the valve to move from a fully open position to a fully closed position, wherein, for each storage tank and its associated valves, a sum of the following terms may be less than 100 milliseconds: a) a maximum of the pressurant entrance valve open time and the propellant exit valve open time; b) a maximum of the pressurant entrance valve close time and the propellant exit valve close time; c) the pressurant exit valve open time; d) the propellant entrance valve open time; and e) a maximum of the pressurant exit valve close time and the propellant entrance valve close time. In another aspect, said sum may be less than 25 milliseconds.

In another preferred aspect, for each storage tank, said associated pressurant exit valve may comprise a plurality of separate flow holes and a movable valving member configured to restrict flow through said plurality of separate flow holes simultaneously. In another aspect, for each storage tank, said associated propellant exit valve may comprise a plurality of separate flow holes. In another aspect, said associated propellant exit valve may be a passive check valve, comprising a movable valving member for each of said separate flow holes, configured to restrict flow through said each of said separate flow holes.

In another preferred aspect, said associated pressurant exit valve for each storage tank may comprise at least one flow hole and a movable valving member configured to restrict flow through said flow hole, wherein a shortest flow distance from said movable valving member to a meniscus of said fluid inside said storage tank when said storage tank is fully filled with said fluid is substantially less than a shortest flow distance from said movable valving member to a meniscus of said fluid inside said storage tank when said storage tank is fully drained of said fluid. In another aspect, each storage tank may comprise a movable partition configured to substantially separate said fluid from said pressurant during filling and draining, wherein a shortest flow distance from said movable valving member to a surface of said movable partition when said storage tank is fully filled with said fluid is substantially less than a shortest flow distance from said movable valving member to said movable partition when said storage tank is fully drained of said fluid. In another preferred aspect, said associated pressurant exit valve for each storage tank may have a total flow cross sectional area that is at least one-tenth of a maximum cross sectional area of said storage tank in a direction perpendicular to a flow direction of said fluid inside said storage tank. In another aspect, a square root of the total flow cross sectional area of said associated pressurant exit valve may be greater, such as ten times greater, than a shortest flow distance from said movable valving member to a surface of said movable partition when said storage tank is fully filled with said fluid.

In another preferred aspect, said associated propellant exit valve for each storage tank has a total flow cross sectional area that is at least one-fourth of a maximum cross sectional area of said storage tank in a direction perpendicular to a flow direction of said fluid inside said storage tank. In another aspect, said associated propellant entrance valve for each storage tank has a total flow cross sectional area that is at least one-fourth of a maximum cross sectional area of said storage tank in a direction perpendicular to a flow direction of said fluid inside said storage tank.

In another preferred aspect, said pressurizer may further comprise a differential piston inside each storage tank.

In another preferred aspect, said movable partition of a first storage tank may be connected to said movable partition of a second storage tank, so that the cycle of the first storage tank and the cycle of the second storage tank are offset by half a cycle.

In another preferred embodiment, the present invention provides for an impulse reaction engine system, comprising: an impulse reaction engine; a propellant tank configured to contain propellant at a low pressure; a gas generator configured to generate pressurant at a high pressure from liquid propellants; and a pressurizer configured to transfer propellant from said propellant tank at said low pressure to said impulse reaction engine at said high pressure in a substantially continuous flow, said pressurizer comprising: at least two storage tanks, wherein, for each storage tank, said pressurizer further comprises: a propellant entrance valve associated with said storage tank and connected between said storage tank and said propellant tank; a propellant exit valve associated with said storage tank and connected between said storage tank and said impulse reaction engine; a pressurant entrance valve associated with said storage tank and connected between said storage tank and said gas generator; and a pressurant exit valve connected to and associated with said storage tank, wherein each of said storage tanks is configured to be filled with said fluid under said low pressure when its associated propellant entrance and pressurant exit valves are open and its associated propellant exit and pressurant entrance valves are closed, and to be drained of said fluid under said high pressure by the force of said pressurant when its associated propellant entrance and pressurant exit valves are closed and its associated propellant exit and pressurant entrance valves are open, wherein, for each storage tank, its associated valves are configured to be opened and closed in a cycle to sequentially fill and drain their associated storage tank of said fluid, said cycle having a cycle time, wherein said cycles of said associated valves of said storage tanks are out of phase with each other such that at some time in which one storage tank is being filled with said fluid, at least one other storage tank is being drained of said fluid, and wherein said cycle time for each storage tank is between 1 and 500 milliseconds. The cycle time may be between 1 and 100 milliseconds.

In a preferred aspect, said pressurizer may further comprise a differential piston inside each storage tank. In another aspect, said pressurizer may further comprise a gas generator pump configured to pump propellant from a high-pressure outlet of said pressurizer to said gas generator.

In another preferred aspect, said associated pressurant exit valve for each storage tank may comprise at least one flow hole and a movable valving member configured to restrict flow through said flow hole, wherein each storage tank comprises a movable partition configured to substantially separate said propellant from said pressurant during filling and draining, wherein a shortest flow distance from said movable valving member to a surface of said movable partition when said storage tank is fully filled with said propellant is substantially less than a shortest flow distance from said movable valving member to said movable partition when said storage tank is fully drained of said propellant. In another preferred aspect, said associated pressurant exit valve for each storage tank may have a total flow cross sectional area that is at least one-tenth of a maximum cross sectional area of said storage tank in a direction perpendicular to a flow direction of said propellant inside said storage tank.

In another preferred embodiment, the present invention provides for a pressurizer for pressurizing a fluid, comprising: a storage tank; an accumulator; a propellant entrance valve connected to said storage tank; a propellant exit valve connected between said storage tank and said accumulator; a pressurant entrance valve connected to said storage tank; and a pressurant exit valve connected to said storage tank, wherein said storage tank is configured to be filled with said fluid under a low pressure when said propellant entrance and pressurant exit valves are open and said propellant exit and pressurant entrance valves are closed, and to be drained of said fluid under a high pressure by the force of a pressurant when said propellant entrance and pressurant exit valves are closed and said propellant exit and pressurant entrance valves are open, wherein said valves are configured to be opened and closed in a cycle to sequentially fill and drain said storage tank of said fluid, said cycle having a cycle time, wherein said accumulator is configured to provide a substantially continuous flow of said fluid at said high pressure by filling with said fluid when said storage tank is draining of said fluid, and by draining of said fluid when said storage tank is filling with said fluid, and wherein said cycle time is between 1 and 500 milliseconds. The cycle time may be between 1 and 100 milliseconds.

In another preferred aspect, said pressurant exit valve may comprise at least one flow hole and a movable valving member configured to restrict flow through said flow hole, wherein said storage tank comprises a movable partition configured to substantially separate said fluid from said pressurant during filling and draining, wherein a shortest flow distance from said movable valving member to a surface of said movable partition when said storage tank is fully filled with said fluid is substantially less than a shortest flow distance from said movable valving member to said movable partition when said storage tank is fully drained of said fluid. In another preferred aspect, said pressurant exit valve may have a total flow cross sectional area that is at least one-tenth of a maximum cross sectional area of said storage tank in a direction perpendicular to a flow direction of said fluid inside said storage tank.

BRIEF DESCRIPTION OF THE DRAWINGS

FIG. 16b shows a side view of the storage tank shown in FIG. 16a.

FIG. 17a shows a perspective view of a pressurizer according to another preferred embodiment.

FIG. 17b shows a perspective view of a pressurizer according to another preferred embodiment.

DETAILED DESCRIPTION

The disclosures of Sobey and Lanning are hereby incorporated by reference to the extent necessary to understand the present invention.

In the following description, the use of "a," "an," or "the" can refer to the plural. All examples given are for clarification only, and are not intended to limit the scope of the invention.

Figure 1:
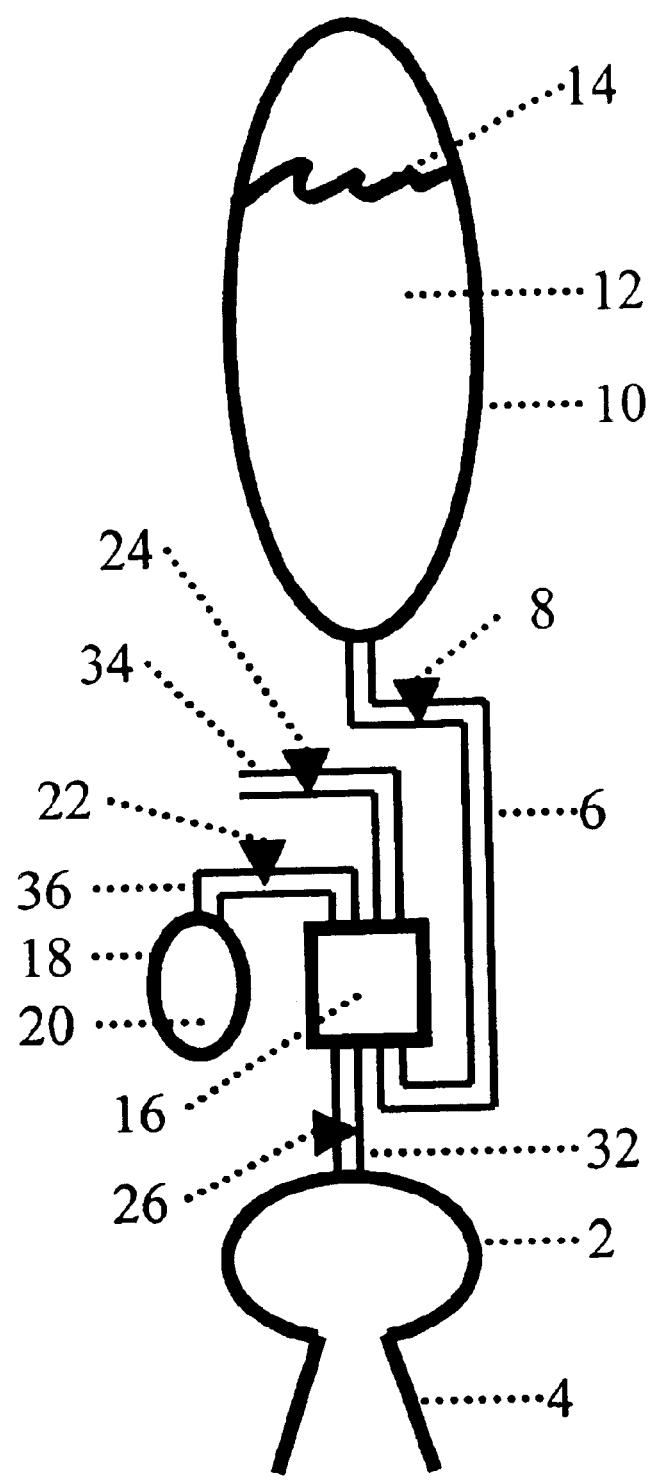
FIG. 1 shows a schematic view of a rocket engine system employing a preferred embodiment of a pressurizer described herein.

Referring to FIG. 1, according to a preferred embodiment, a rocket engine system includes a propellant tank 10 connected by a propellant conduit 6 to a pressurizer 16, a pressurant tank 18 connected by a pressurant conduit 36 to the pressurizer 16, and an impulse reaction engine 2 (also known as a rocket engine 2 or jet engine 2) with a nozzle 4 connected by an engine conduit 32 to the pressurizer 16. The propellant tank 10 contains a propellant 12 with meniscus 14. Flow of the propellant 12 into pressurizer 16 is controlled by propellant valve 8. A pressurant tank 18 contains a pressurant 20. Flow of the pressurant 20 into pressurizer 16 is controlled by pressurant valve 22. Flow of propellant 12 from pressurizer 16 to engine 2 is controlled by engine valve 26. Pressurant exhaust is released from exhaust conduit 34, and its flow is controlled by exhaust valve 24.

Propellant 12 combusts in engine 2 and the resulting gas accelerates through nozzle 4. Propellant 12 can be any monopropellant, such as a substance that decomposes by itself or in the presence of a catalyst. One example is hydrogen peroxide. Propellant 12 can also be a fuel or an oxidizer in a hybrid rocket engine system. For example, propellant 12 could be liquid oxygen and engine 2 could contain a solid resin fuel. Further, propellant 12 need not be a reacting substance at all—it could be a working medium that is heated by an external heat source. For example, propellant 12 could be liquid hydrogen and engine 2 could contain a nuclear reactor that heats the hydrogen to high pressures. Engine 2, as is apparent to one skilled in the art, is simply a device that ejects a propellant or working medium (usually a hot gas) substantially in one direction to provide an impulse reaction force in an opposite direction. The propellant/working medium need not be ejected perfectly in one direction; rather, it simply must not be ejected isotropically, otherwise the engine 2 will experience no impulse reaction force in any particular direction. However, in a preferred embodiment, engine 2 ejects the propellant/working medium in substantially one direction.

Pressurant 20 can be any high-pressure fluid, and the following description is meant as an example and not as a limitation. Pressurant 20, if it comes into direct contact with the propellant 12, should be nonreactive with propellant 12. (An embodiment will be described later in which the pressurant 20 does not come into contact with propellant 12.) Further, it should not react with the walls of the pressurant tank 18 or any of the components of the pressurizer herein described. For example, two fluids that meet this description are inert gases such as helium and nitrogen. However, both of these fluids are gases at room temperature (regardless of their pressure); therefore, a high density may be difficult to obtain. A high density for pressurant 20 is necessary so that a large quantity of pressurant 20 can be held in a small pressurant tank 18. Because pressurant tank 18 is designed to withstand very high pressures, its walls may be very thick, resulting in a large weight. Therefore, the smaller the pressurant tank 18, the better. In a preferred embodiment of the present invention, the pressurant 20 is a liquid with a very high vapor pressure. For example, liquid carbon dioxide at room temperature has a vapor pressure of approximately 750 PSI. However, 750 PSI, while high, may not be high enough. As another example, liquid nitrogen can be heated until its vapor pressure is, for example, 2000 PSI. Because of the very high vapor pressure attainable, and because liquid nitrogen is much denser than gaseous nitrogen, liquid nitrogen may be a good choice for pressurant 20. Further, pressurant 20 may be the hot gaseous combustion products of a gas generator. One skilled in the art will realize that a plethora of other good choices exist for pressurant 20.

Figure 10:
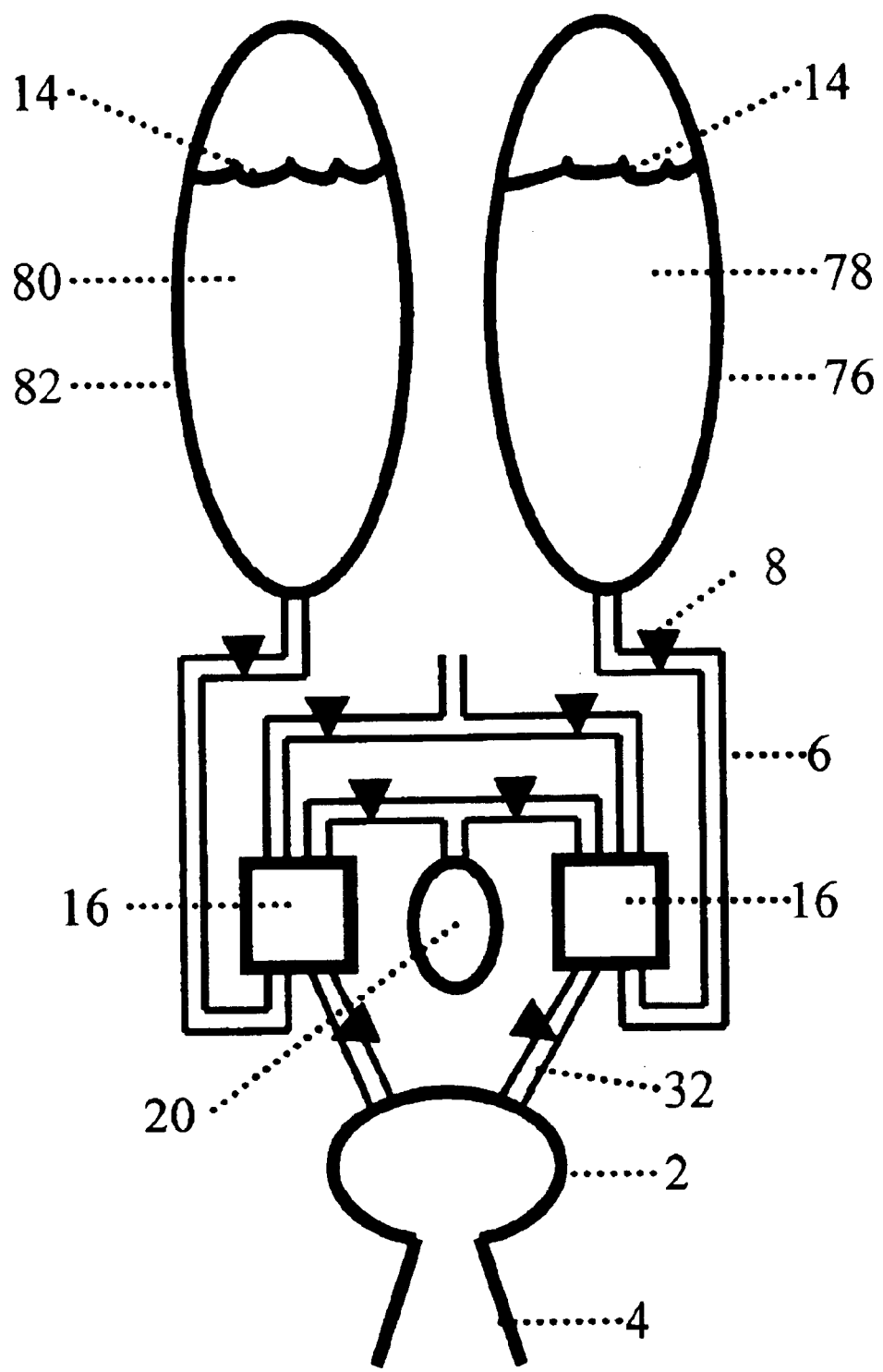
FIG. 10 shows a schematic view of a rocket engine system according to a preferred embodiment employing two propellants.

Referring to FIG. 10, in another preferred embodiment of the present invention, the rocket engine system comprises two propellants, a fuel 78 contained in a fuel tank 76 and an oxidizer 80 contained in an oxidizer tank 82. Each of the fuel and the oxidizer has its own pressurizer 16, and the pressurizers 16 may or may not share a common pressurant 20. In other embodiments, the rocket engine system could comprise more than two propellants, or two propellants other than a fuel and oxidizer. For example, it could comprise a fuel, an oxidizer, and a catalyst, or a decomposing propellant and a catalyst. Many different potential combinations of propellant tanks and pressurizers would be apparent to one skilled in the art.

Figure 2:
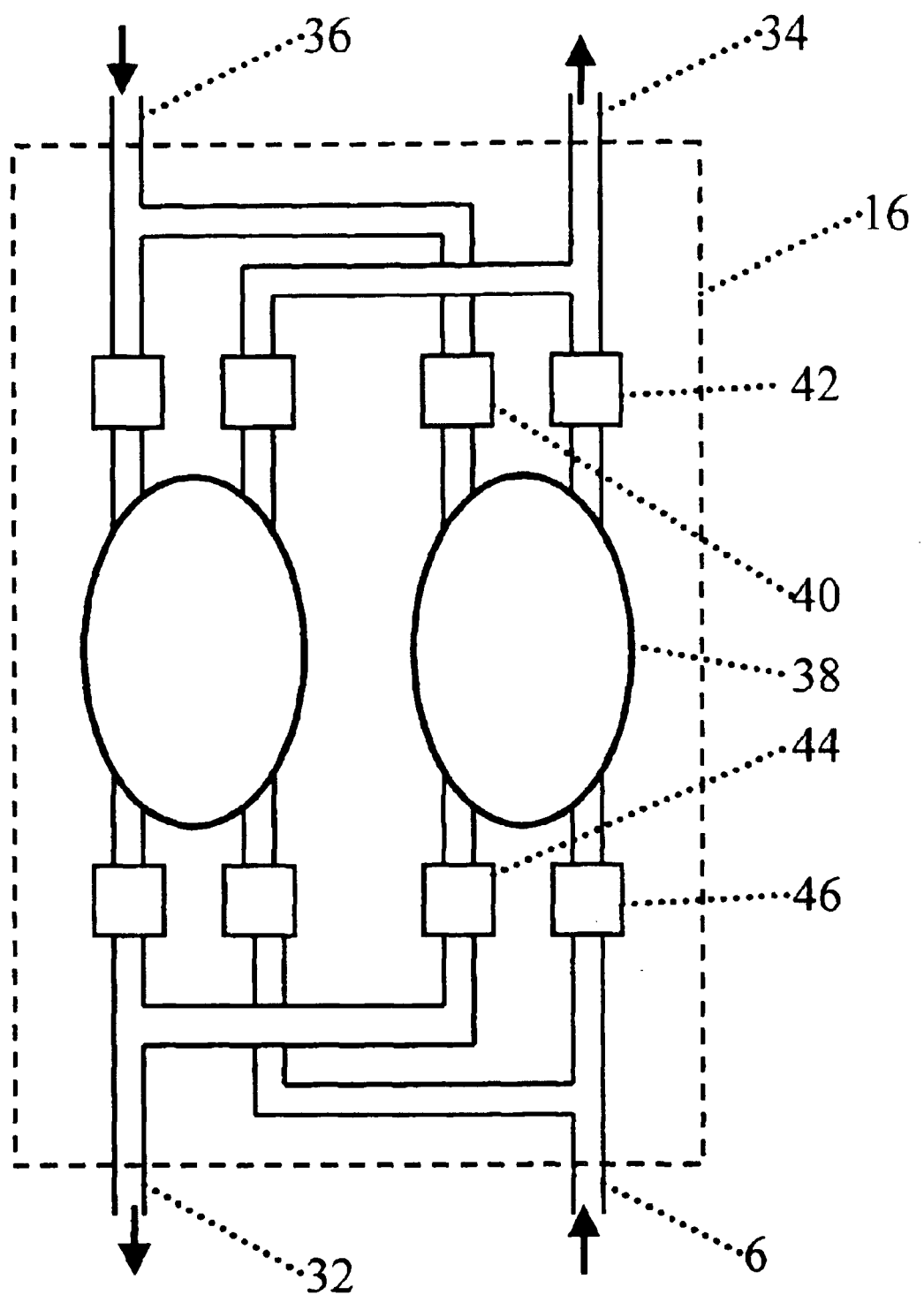
FIG. 2 shows a schematic view of a preferred embodiment of a pressurizer described herein.

Referring now to FIG. 2, a pressurizer according to a preferred embodiment includes: two or more storage tanks 38; and, for each storage tank 38, a pressurant entrance valve 40, a pressurant exit valve 42, a propellant exit valve 44, and a propellant entrance valve 46. Propellant 12 flows into each storage tank 38 through propellant conduit 6 and propellant entrance valve 46 and out of each storage tank 38 through propellant exit valve 44 and engine conduit 34. Pressurant 20 flows into each storage tank 38 through pressurant conduit. 36 and pressurant entrance valve 40 and out of each storage tank 38 through pressurant exit valve 42 and exhaust conduit 34. Propellant 12 and pressurant 20 flow in the direction indicated by the arrow shown in each conduit.

The pressurizer provides a substantially continuous stream of propellant from propellant tank 10 at low pressure to the engine 2 at high pressure. In operation, each storage tank 38 undergoes a full cycle, including a complete filling and draining cycle. Consider, for example, the storage tank 38 depicted on the right of FIG. 2. It begins full of propellant, and all valves 40-46 are closed. Pressurant entrance valve 40 is opened, causing high pressure pressurant to fill inside any conduit (e.g., between the valve 40 and the storage tank 38) and any ullage space above the propellant meniscus. Next, propellant exit valve 44 is opened, causing propellant 12 to be pushed downwards, under the pressure action of the high-pressure pressurant, into engine 2 via engine conduit 32. After the storage tank 38 is drained of propellant 12, valves 40 and 44 are closed, and pressurant exit valve 42 is opened. Because the pressurant has a pressure much higher than the ambient/exhaust pressure outside pressurant exit valve 42, pressurant 20 flows out of the storage tank 38 and, given enough time, depressurizes to a pressure at or lower than the pressure inside the propellant tank 10. Next, propellant entrance valve 46 is opened, and propellant 12, which is now at a higher pressure than the storage tank 38, flows into the storage tank 38. After the storage tank 38 is filled, valves 42 and 46 are closed and the cycle is repeated. The storage tank 38 depicted on the left side of FIG. 2 has a similar cycle, except that the cycles of the two storage tanks 38 are offset with respect to each other by about a half cycle, so that for most of the time that one storage tank 38 is filling, the other storage tank 38 is draining. Because at least one storage tank 38 is always or almost always draining, the pressurizer 16 provides a continuous or almost continuous stream of propellant 12 draining to engine 2. In order to guarantee a continuous stream, one or both of the following may be employed: a) first, an accumulator 84 (shown and described in FIG. 14) may be added to smooth out any pressure fluctuations and, if necessary, to provide propellant 12 to the engine 2 when no storage tank 38 is draining; b) adjusting the pressure differentials across the filling side (i.e., the pressure drop from the propellant tank 10 to the exhaust pressure) and the draining side (i.e., the pressure drop from the pressurant tank 18 to the propellant outlet of the pressurizer 16) so that each storage tank 38 drains propellant 12 for at least or more than half the cycle, so that always at least one of the storage tanks 38 is draining. Each storage tank 38 may, of course, include a sensor, feedback, and control system (not shown) configured to measure the location of the meniscus of propellant 12 inside the storage tank 38, and to open and close the corresponding valves 40-46 when necessary to successfully fill and drain each storage tank 38.

Figure 3:
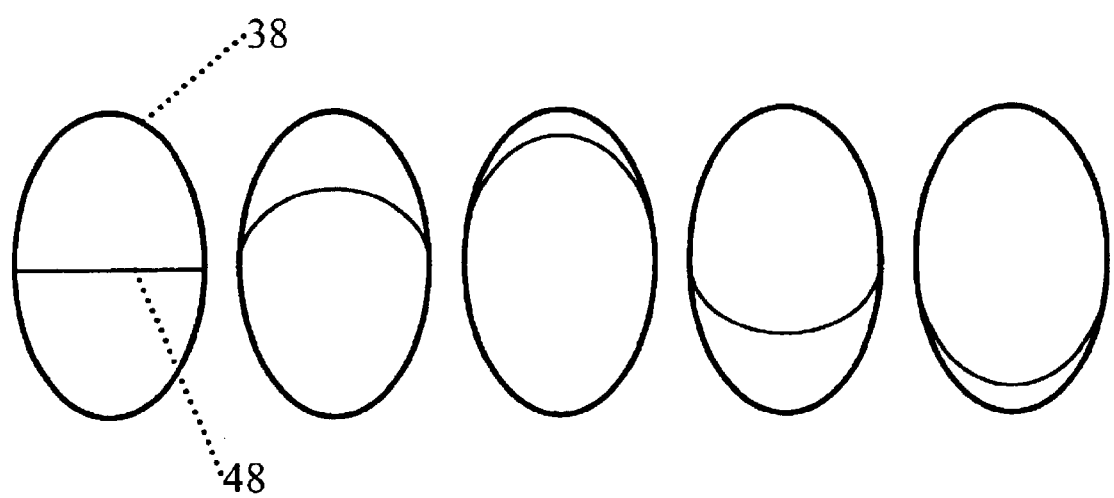
FIG. 3 shows a schematic view of five storage tanks, each having a movable partition in a different position.

Each storage tank 38 may contain a movable partition, such as a membrane, a diaphragm, a piston, or another separator. FIG. 3 shows five storage tanks 38, each tank having a movable membrane 48. The membrane 48 may be secured to the inside middle of the storage tank 38, so that a cross section of the storage tank 38 in the middle of draining (or filling) would look like the storage tank 38 depicted at the far left of FIG. 3. The next storage tank 38 (to the right) depicts a storage tank 38 having a membrane 48 and drained about ⅓ (or filled about ⅔). The next storage tank 38 (to the right) has drained very little, if any (or is almost or completely filled). The next storage tank 38 is about ⅔ drained (or ⅓ filled), and the next storage tank 38 is almost or completely drained (or has filled very little, if any). The membrane 48 has several possible benefits. First, it may physically separate the pressurant 20 from the propellant 12. Thus, if pressurant 20 and propellant 12 were chemically reactive, membrane 48 may prevent chemical reaction. Second, it may thermally isolate the pressurant 20 from the propellant 12. Thus, if there were a large temperature difference between the two (e.g., pressurant 20 is hot gas from a gas generator and propellant 12 is cryogenic), membrane 48 may reduce heat transfer between the two. Third, membrane 48 may prevent splashing and sloshing of propellant 12 inside storage tank 38. Fourth, without the presence of membrane 48 (or other movable partition), at least one of these effects may occur: a) if valves 42 and 46 are kept open for too long, storage tank 38 may become overfilled, causing propellant 12 to be exhausted via exhaust conduit 34; b) if valves 40 and 44 are kept open for too long, storage tank 38 may become overdrained, causing pressurant 20 to be injected into the engine 2 via engine conduit 32. The membrane 48 may serve to prevent these problems.

Figures 4A, 4B, 4C, 4D:
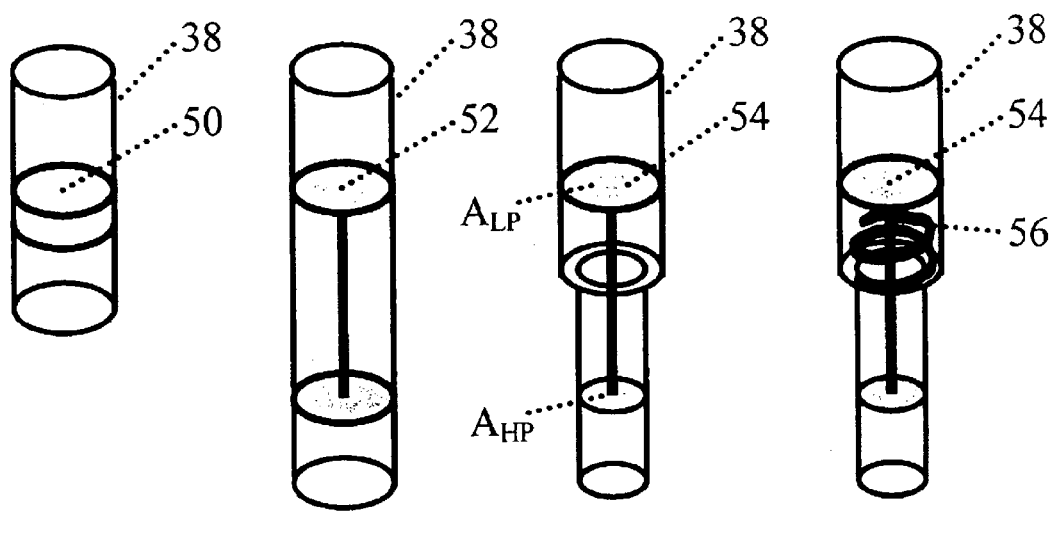
FIG. 4a shows a perspective view of a storage tank having a short piston.
FIG. 4b shows a perspective view of a storage tank having a long piston.
FIG. 4c shows a perspective view of a storage tank having a differential piston.
FIG. 4d shows a perspective view of a storage tank having a spring-loaded differential piston.

FIGS. 4a–4d show other examples of movable partitions. The storage tank 38 may be cylindrical, or have other shapes. For example, FIG. 4a shows a short piston 50 inside a cylindrical storage tank 38. Short piston 50, unlike membrane 48 shown in FIG. 3, is not attached to the inside of storage tank 38; rather, it may move relatively freely in the flow direction of propellant 12 inside the storage tank 38. Short piston 50 may also include piston rings (not shown) to provide a better seal with the storage tank 38, to prevent or reduce leakage of pressurant 20 or propellant 12 around the piston 50. Short piston 50 offers many or more of the same advantages as the membrane 48. FIG. 4b shows a long piston 52 inside a storage tank 38. Long piston 52 may serve an additional function. In FIG. 4a, even though the short piston 50 may directly thermally isolate propellant 12 from pressurant 20, there may be some heat transfer via the walls of the storage tank 38. For example, say that propellant 12 is a cryogen and pressurant 20 is hot gas. When short piston 50 is at the top of storage tank 38 (i.e., near or at the end of the filling cycle), the walls of storage tank 38 have been cooled to cryogenic temperatures by the propellant 12. Then, as pressurant 20 fills inside storage tank 38 (above the piston) during the draining cycle, the pressurant 20 is cooled by the walls of the storage tank 38, causing the pressure of the pressurant 20 to decrease, a very undesirable effect. Thus, the long piston 52 in FIG. 4b alleviates this problem by preventing propellant 12 and pressurant 20 from coming into direct contact with the same wall section inside storage tank 38. Thus, the top portion of storage tank 38 in FIG. 4b will remain hot, while the bottom portion of storage tank 38 will remain cold.

Next, FIG. 4c shows a storage tank 38 having a differential piston 54. The use of a differential piston 54 the further advantage of allowing a lower pressure fluid (in this case, pressurant 20) to push or compress a higher pressure fluid (in this case, the propellant 12 being pushed into the engine 2). An upper portion of each storage tank 38 is configured to accommodate a pressurant 20 having a lower pressure and a lower portion of each storage tank 38 is configured to accommodate a propellant 12 at a higher pressure. Therefore, the upper lower-pressure portion of each storage tank 38 has a cross sectional area of $A_{LP}$ which is greater than a cross sectional area $A_{HP}$ of the lower higher-pressure portion of the storage tank 38. Each differential piston 54 is configured to fit snugly into its corresponding storage tank 38 to prevent passage of gas or fluid between the upper and lower portions of the storage tank 38. For example, an upper portion of the piston 54 may have a diameter (or other dimension, if the storage tanks 38 are not cylindrical in shape) approximately equal to a diameter of the upper portion of the storage tank 38 (and similarly for the lower portions of the storage tank 38 and piston 54). Further, an outer rim of the upper portion of the piston 54 (as well as an outer rim of the lower portion of the piston 54) may be coated with a sealing substance, such as rubber, plastic, Teflon, or other material, or they may have piston rings. A benefit to the differential piston 54 is that a fluid in the lower higher-pressure portion (in this case, the propellant 12) may be pressurized to an effective pressure that is higher than a pressure of a pressurizing gas in the upper lower-pressure portion (in this case, the pressurant 20). For example, if the spindle 26 was used in the pressurizer 16 of the rocket engine system shown in FIG. 1, and the combustion pressure of the engine 2 was 2,000 PSI, then the pressure of the pressurant 20 at its entrance into the pressurizer 16 via the pressurant conduit 36 could be 2,000 PSI or less. Another benefit to such an embodiment is that the combustion gases themselves could be used as the pressurant 20.

Next, FIG. 4d shows a storage tank 38 having a differential piston 54 and a spring 56 which is designed to spring load the differential piston upward (or toward a full filled position). This may have several advantages, such as: a) the time to depressurize the pressurant 20 from storage tank 38 may be reduced because it is being pushed out by the spring 56; b) the pressure drop across the filling side may be reduced (or may be zero, such as in an air-breathing engine) because filling is facilitated by the spring 56. Further, spring 56 may be any device or system that provides a force, such as a hydraulic or pneumatic system. For example, the region in the top portion of storage tank 38 below the top of piston 54 may be pressure isolated from the corresponding region in the bottom portion of storage tank 38 above the bottom of piston 54, and may contain a pressurized gas that acts somewhat like a spring to push piston 54 upwards. Other means of automatically lifting piston 54 will be apparent to one skilled in the art. Further, other embodiments could employ such a spring 56 or means, such as the embodiment shown in FIG. 4b.

Short piston 50 in FIG. 4a could, for example, be a spherical ball, such as a bearing ball. An advantage to using bearing balls as short pistons 50 is greater simplicity and reduced cost, because bearing balls are very inexpensive. Further, because they are spherical, their rotational orientation need not remain constant about any axis (whereas a cylindrical short piston 50 must maintain its rotational orientation about a lengthwise axis of its corresponding storage tank 38). The bearing balls may be made of stainless steel or a ceramic or other strong material, and have a diameter approximately equal to a diameter of storage tanks 38, so that each bearing ball snugly fits into its corresponding storage tank 38 to substantially prevent leakage from a top portion of the storage tank 38 to a bottom portion of the storage tank 38 (and vice versa). Further, each bearing ball may be coated with a sealing substance, such as rubber, plastic, or Teflon, to further improve leak resistance around the bearing ball.

The propellant 12 at its entrance into the pressurizer 16 is at a higher pressure than the exhaust pressure of the exhaust conduit 34 because of a pressure head due to the height of meniscus 14 relative to the entrance of the propellant 12 into the pressurizer 16. However, this pressure may or may not be sufficient. In order to increase this pressure, and thereby increase the flow rate of propellant 12 into each storage tank 38, the propellant tank 10 may be pressurized. The propellant tank 10 need not be pressurized to a very high pressure, and should be much lower than the pressure of the pressurant 20. (If the propellant 12 were pressurized to a pressure at or above the pressure of the pressurant 20, there would be no need for the pressurizer 16, and the walls of the propellant tank 10 would have to be very thick and heavy.) By way of example and not of limitation, the propellant tank 10 could be pressurized to between 10 and 200 PSI.

Figure 5:
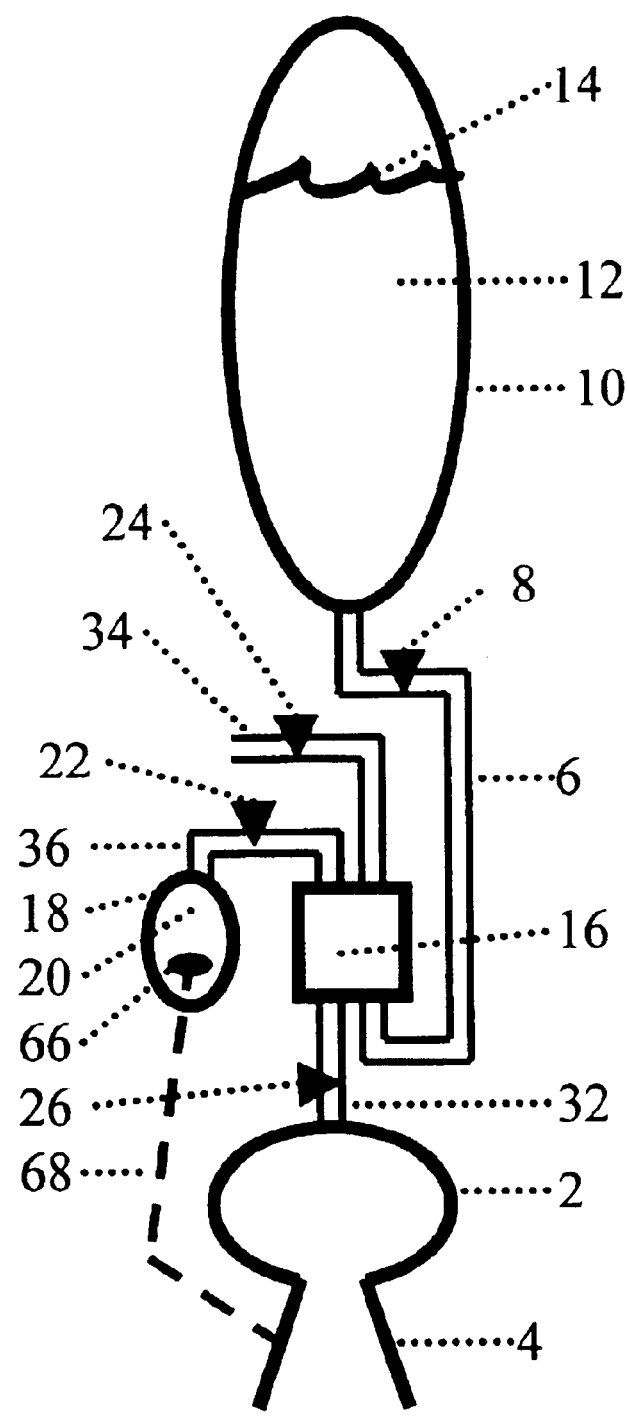
FIG. 5 shows a schematic view of a rocket engine system with a heater for the pressurant.

Referring now to FIG. 5, in another preferred embodiment, pressurant tank 18 contains a heating element 66 to heat the pressurant 20. If pressurant 20 is a liquid with a high vapor pressure, then as the vapor expands (corresponding with the pressurizing of the storage tanks 38 according to the cycle previously explained), the liquid evaporates to replenish the vapor, causing the temperature of the liquid to drop, resulting in a corresponding drop in the vapor pressure. In order to assure a constant vapor pressure of the pressurant 20, heating element 66 applies heat to pressurant 20, keeping it at a substantially constant temperature. The heating element 66 can be an electric resistance element or combustor in which a small quantity of propellant 12 combusts/decomposes. Further, a heat conductive lead 68 could connect the heating element 66 with the engine 2 or the nozzle 4, thus conducting some of the heat of combustion in the rocket engine 2 to the pressurant 20. Further, heat conductive lead 68 could consist of conduit, thus directing a small stream of combustion gases directly from the engine 2 to the heating element 66, and then possibly back to the engine 2. One skilled in the art would realize the many ways possible to provide heat to pressurant 20 to keep it at a constant temperature and vapor pressure.

Figure 6:
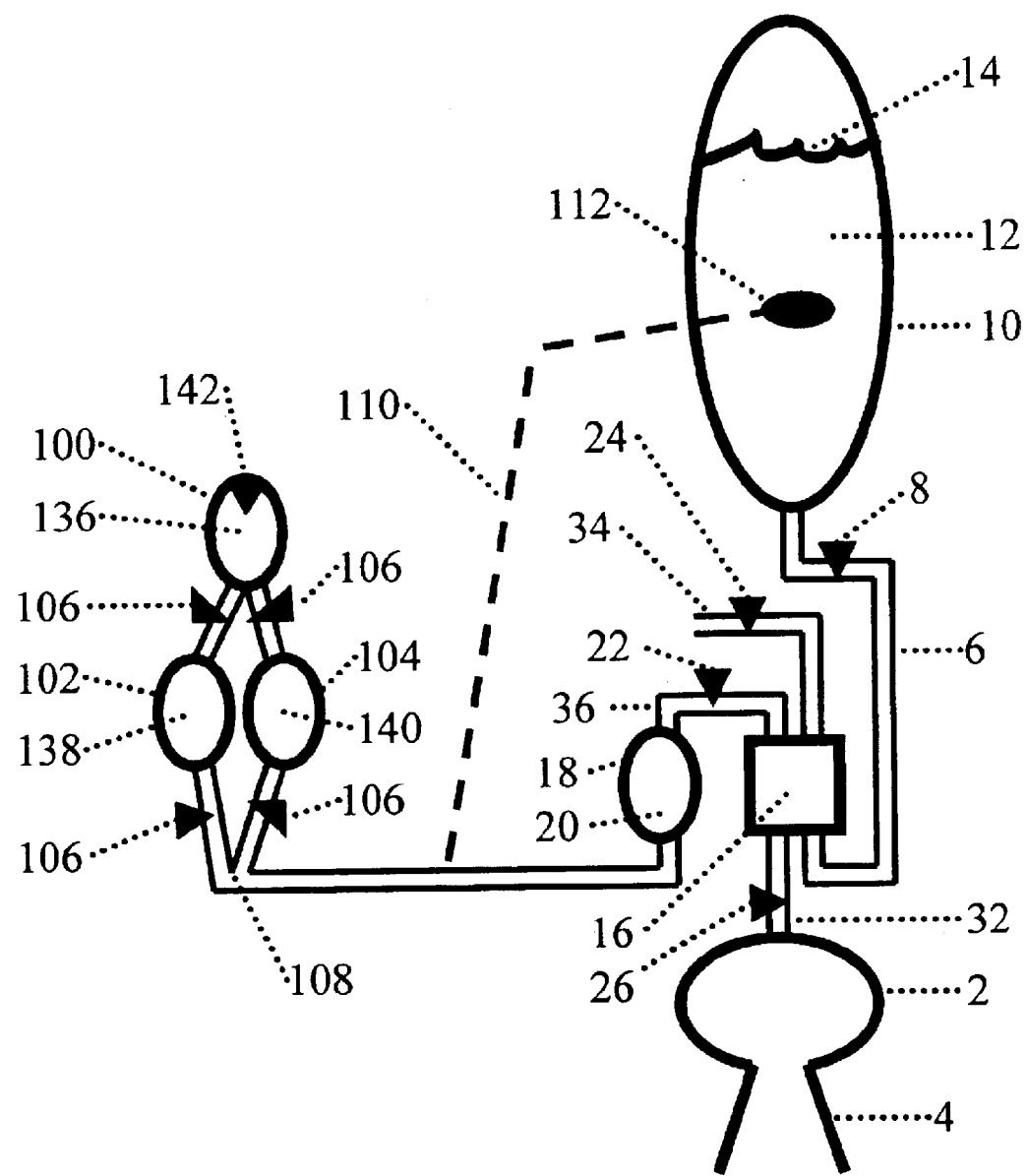
FIG. 6 shows a schematic view of a rocket engine according to a preferred embodiment employing a gas generator for the pressurant.

Referring now to FIG. 6, the pressurant 20 may be generated in whole or in part by a gas generator system, comprising a high-pressure gas 136 in pressurized gas tank 100, a fuel 138 in fuel tank 102, an oxidizer 140 in oxidizer tank 104, optional valves and/or regulators 106, and an optional igniter and/or catalyst 108, 142. The pressurized gas tank 100 may be filled with a high-pressure gas 136 that is inert with respect to the fuel 138 and oxidizer 140 inside the fuel tank 102 and oxidizer tank 104, respectively. Alternatively, the system may comprise a membrane, piston, or other divider between the high-pressure gas 136 and the fuel 138 and/or oxidizer 140, in which case the high-pressure gas 136 need not be inert with respect to the fuel 138 and/or oxidizer 140. The high-pressure gas 136, like the pressurant 20 described with regard to FIG. 1, may comprise high-pressure nitrogen, helium, or other gas (e.g., noble gas). A benefit of using a gas generator to create the pressurant 20 (instead of using merely a pre-pressurized pressurant 20) is that the pressurant 20 can be quickly re-generated as it is used up by the pressurizer 16. Further, a far lower volume of high-pressure gas 136 (in pressurized gas tank 100), fuel (in fuel tank 102), and oxidizer (in oxidizer tank 104) is needed to generate a corresponding volume of pressurant 20 having the same pressure. The far lower volume manifests itself in a far lower total rocket engine system mass, because the total mass of tanks associated with pressurant 20 is less for a system using a gas generator.

The high-pressure gas 136 in pressurized gas tank 100 may be placed in the tank 100 mechanically (e.g., with pumps), or by igniting a mixture of fuel and oxidizer (or decomposing a decomposable compound) inside the tank 100. For example, the tank 100 may initially be filled with a separated mixture of nitric acid (oxidizer) and ethanol (fuel). Then, when it is time to pressurize the gas generator system (to thus pressurize the pressurant tank 18 with pressurant 20), the nitric acid and ethanol may be mixed while in contact with an igniter (or catalyst) 142, thus combusting the two into hot, high-pressure reaction gases that serve as high-pressure gas 136. Preferably, the nitric acid and ethanol are mixed slowly enough that the resulting heat may be dissipated by convection or radiation from the walls of the pressurized gas tank 100, and the resulting high-pressure gas 136 is relatively cool. Igniter/catalyst 142 may, e.g., be an electrical resistor or a pyrotechnic igniter, or a catalyzing substance. Many other alternative means for creating the high-pressure gas 136 will be apparent to one skilled in the art. For example, pressurized gas tank 100 may be filled with hydrogen peroxide; when it is time to pressurize the gas generator system, the catalyst 142 may be used to catalyze hydrogen peroxide into steam and high-pressure oxygen. The steam may be condensed by letting it cool off, with the resulting high-pressure gas 136 consisting primarily of high-pressure oxygen. As another example, a stable, decomposable compound, such as TNT, may be deflagrated (not detonated) inside the pressurized gas tank 100 using the igniter/catalyst 142, resulting in product gases that serve as the high-pressure gas 136. The pressurized gas tank 100, the fuel tank 102, and the oxidizer tank 104 should each have a wall thickness sufficient to withstand the very high pressure of the high-pressure gas 136. Further, the fuel and oxidizer used to generate the high-pressure gas 136 (if such are used) may be the same as the fuel 138 and oxidizer 140 used to generate the pressurant 20, which may be the same as the fuel 78 and oxidizer 80 shown in FIG. 19. Alternatively, there may only be a single tank 102 in the case of a decomposable monopropellant, such as hydrogen peroxide.

Reference number 106 may designate either a valve or a pressure regulator or both. For example, 106 may simply be a valve having two positions (open and close). In such an embodiment, after the tank 100 is pressurized with high-pressure gas 136, the valves 106 (between tank 100 and tanks 102, 104) may be opened to pressurize the fuel tank 102 and oxidizer tank 104 with the high-pressure gas 136, thus placing a pressure force on fuel 138 and oxidizer 140. If the valves 106 between the tanks 102, 104 and pressurant tank 18 are then opened, the fuel 138 and oxidizer 140 will flow in the direction of the pressurant tank 18. The fuel 138 and oxidizer 140 will then mix at a point of intersection, where the mixture comes into contact with an igniter/catalyst 108, which serves to combust the mixture. The resulting combustion gases are plumbed to the pressurant tank 18 as pressurant 20. In this embodiment, the pressurant 20 in the pressurant tank 18 is approximately in pressure equilibrium with the fuel 138, oxidizer 140, and high-pressure gas 136 (neglecting pressure differentials due to flow, which is relatively slow); thus, the pressure of pressurant 20 is approximately equal to or slightly less than the pressure of high-pressure gas 136. This is because the flow rate from tanks 102, 104 to pressurant tank 18 depends on the pressure differential between the tanks. When the pressure in pressurant tank 18 is slightly lower than in the tanks 102, 104, fuel 138 and oxidizer 140 flow from their respective tanks 102, 104 past igniter/catalyst 108, where they combust to create more pressurant 20, thus increasing the pressure in pressurant tank 18. The flow from tanks 102, 104 effectively stops when the pressures in tanks 102, 104 and pressurant tank 18 are equal. A benefit to this embodiment is that the pressurant 20 is always at a maximum pressure; a detriment is that the pressure of the pressurant 20 will vary (decrease) with the decrease in pressure of the high-pressure gas 136, which results from the expansion of high-pressure gas 136 into fuel tank 102 and oxidizer tank 104.

In another embodiment, valves 106 may be adjustable (i.e., closed, 10% open, 50% open, etc.) according to a desired flow rate of fuel 138 and oxidizer 140, or a desired pressure of pressurant 20. For example, the valves 106 may be adjusted by a controller which opens and closes the valves 106 based on feedback information received from a pressure sensor 144 (to be discussed later with respect to FIG. 7). If the pressure of pressurant 20 is too high during operation of the rocket engine system, as determined by a sensor 144, the valves 106 between tank 100 and tanks 102, 104 (alternatively, the valves 106 between tanks 102, 104 and pressurant tank 18, or both sets of valves 106) may be slightly closed (e.g., closed from 50% open to 40% open) to reduce the flow of fuel 138 and oxidizer 140, thus reducing the rate of generation of pressurant 20 in pressurant tank 18.

In another embodiment, the valves 106 between tank 100 and tanks 102, 104 (alternatively, the valves 106 between tanks 102, 104 and pressurant tank 18, or both sets of valves 106) may be flow or pressure regulators, designed to adjust flow rate based on a desired pressure. For example, high-pressure gas 136 may have a pressure of 5,000 PSI and the regulators 106 between tank 100 and tanks 102, 104 may be designed to regulate the pressure inside tanks 102, 104 to 3,000 PSI. Then, the pressure inside tanks 102, 104 will stay approximately constant (thus resulting in an approximately constant pressure of pressurant 20) for as long as the pressure of high-pressure gas 136 exceeds 3,000 PSI. In this embodiment, the pressurant 20 is in approximate equilibrium with the fuel 138 and oxidizer 140; therefore, the pressure of the pressurant 20 remains approximately 3,000 PSI (neglecting pressure differentials due to flow).

In another embodiment, heat transfer devices 110, 112 are arranged between the igniter/catalyst 108 and the propellant 12 for cooling off the pressurant 20 immediately after it is formed by combustion of the fuel 138 and oxidizer 140. Device 110 may be conduit for transferring the pressurant 20 to and from a heat transfer coil 112 inside the propellant tank 10, thus transferring the heat of combustion of the fuel 138 and oxidizer 140 to the propellant 12 (which may help to further pressurize the propellant 12, if necessary). Alternatively, devices 110, 112 may simply be fins or other heat exchange devices for cooling off the pressurant 20. Alternatively, the gas generating system may be arranged inside the propellant tank 10, so that the pressurant 20 is cooled immediately after it is formed by combustion of the fuel 138 and oxidizer 140. However, with the use of thermally isolating movable partitions inside storage tanks 38, as shown in FIGS. 3, 4a–4d, there may be no need to cool the gas generated from the gas generator system prior to use as a pressurant 20 inside the pressurizer 16.

Figure 7:
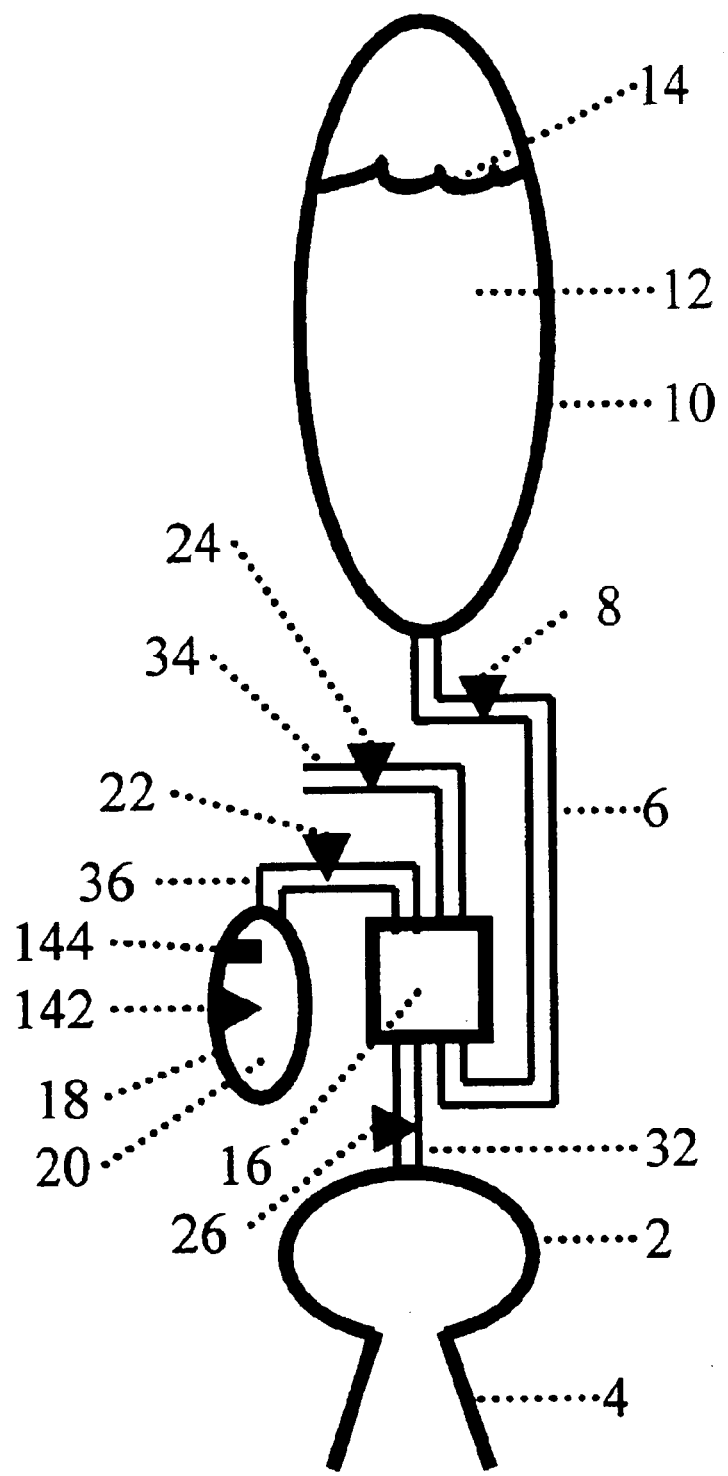
FIG. 7 shows a schematic view of a rocket engine according to another preferred embodiment employing a gas generator for the pressurant.

Referring now to FIG. 7, tanks 100, 102, and 104 may be omitted entirely if a controlled combustion or decomposition, spread out in time over the expected burn time of the rocket engine 2, can be made to occur inside the pressurant tank 18, as discussed previously with regard to pressurized gas tank 100. For example, pressurant tank 18 may include an igniter/catalyst 142 and a pressure sensor 144 configured to control the igniter/catalyst (via a controller, for example). The pressurant tank 18 may be filled with a decomposable monopropellant, or a separated mixture of a fuel and oxidizer, or the like. The gas generator system may then be programmed to control the igniter/catalyst 142 in response to pressure signals from the sensor 144 so that the pressure of the pressurant 20 inside pressurant tank 18 remains constant (or at a desired pressure). For example, in a pressurant tank 18 containing hydrogen peroxide, the igniter/catalyst 142 may be controlled to catalyze the hydrogen peroxide (to form pressurant 20) at a rate such that the sensor 144 measures a pressure of 3,000 PSI. A benefit to such an embodiment is its simplicity and that the pressure of pressurant 20 is readily adjustable (by controlling the igniter/catalyst 142 as a function of the pressure measured by the sensor 144).

Figure 8:
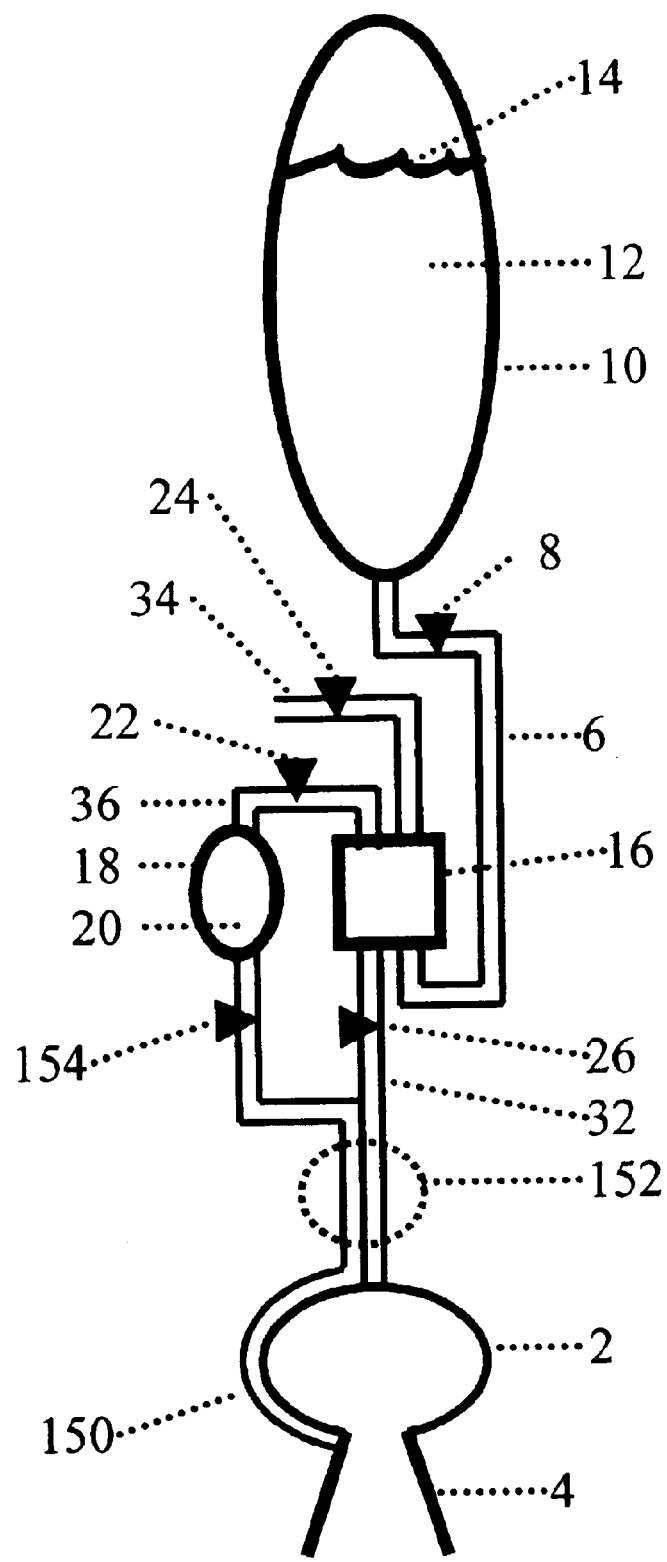
FIG. 8 shows a schematic view of a rocket engine according to another preferred embodiment.

FIG. 8 shows an embodiment in which the combustion gases are used as the pressurant 20. The rocket engine system shown in FIG. 8 includes a combustion gas conduit 150 that may run along the outside of the combustion chamber of the engine 2. The conduit 150 is configured to flow hot, high-pressure combustion gases from the combustion chamber to the pressurant tank 18 via an optional heat transfer area 152, regulated by valve 154. The heat transfer area 152 is an area in which the conduit 150 comes into heat contact with the engine conduit 32. Because the propellant 12 flowing from the pressurizer 16 to the engine 2 is much cooler than the hot combustion gases inside the combustion chamber of the engine 2 (particularly where the propellant 12 is a cryogenic propellant), the propellant 12 will absorb much of the heat of the hot combustion gases in the heat transfer area 152. As the propellant 12 flows from the pressurizer 16 to the engine 2, it heats up inside the heat transfer area 152 by absorbing heat from the hot combustion gases flowing through the combustion gas conduit 150. Conversely, as the hot combustion gases flow from the engine 2 to the pressurant tank 18 via the heat transfer area 152, they cool down by transferring heat to the propellant 12 flowing through the engine conduit 32. Because the combustion gases, even after cooling, have a very high pressure, they can be used as the pressurant 20 where differential pistons 54 (as shown in FIGS. 4c and 4d) are used inside the storage tanks 38 of the pressurizer 16. The pressure inside the pressurant tank 18 may be adjusted by adjusting the flow rate of combustion gases into the tank 18 by adjusting the valve 154. An advantage to this embodiment is that a large tank of pressurant 20 is not necessary; in fact, the pressurant tank 18 itself is optional. In another embodiment, a small pressurant tank 18 is filled with a small quantity of high-pressure pressurant 20, sufficient to provide enough propellant 12 to the engine 2 to start and sustain combustion inside the engine 2. Once the combustion has started and the combustion pressure has built up to a sufficient level, the valve 154 (which was closed during start-up) may be opened, allowing the combustion gases to pressurize the pressurant tank 18.

Figure 9:
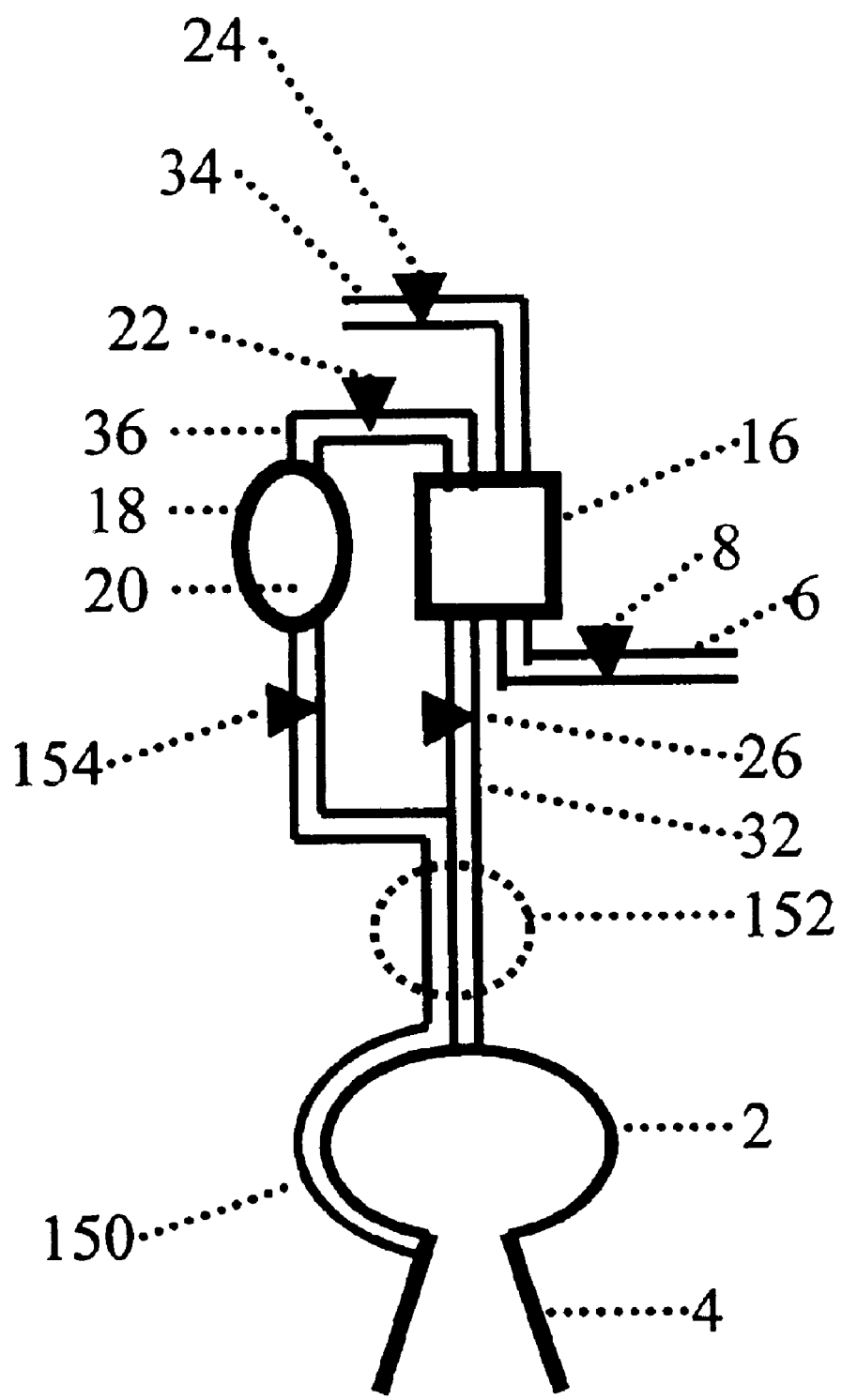
FIG. 9 shows a schematic view of a rocket engine according to another preferred embodiment.

Referring now to FIG. 9, the present invention may also be applied to an air-breathing rocket engine (e.g., a jet engine). FIG. 9 is similar to FIG. 8, except that the propellant tank 10 and corresponding propellant 12 have been removed. In FIG. 9, the propellant is air, and propellant conduit 6 is open to the atmosphere. Not shown in FIG. 9 is, of course, a second propellant (such as gasoline or kerosene) and a corresponding propellant tank and pressurizer system to provide the second propellant for the air to burn. FIG. 9 could, instead, be designed as an air-breathing hybrid rocket engine, in which case a propellant tank and pressurization system for the second propellant may not be necessary.

In an air-breathing rocket engine, because the propellant (or at least one of the propellants) exists in a gaseous state, the propellant is compressible (whereas a liquid propellant is largely incompressible). Therefore, in using the embodiment shown in FIG. 2 (which may normally be configured for use in a liquid or hybrid rocket engine system) in an air-breathing rocket engine system, some of the otherwise wasted pressurant exhaust (vented via exhaust conduit 34) may be used to pre-pressurize the propellant (compressible air) in at least one other separate pressurizer 16, operating at lower pressure.

In the embodiment shown in FIG. 9, both the propellant conduit 6 and exhaust conduit 34 are shown to have a fluid connection to the atmosphere, thus having approximately the same pressure (i.e., the pressure drop across the filling side is zero). Therefore, no pressure differential is available to fill each storage tank 38 with the propellant (air). This problem may be solved by using the storage tank 38 shown in FIG. 4d, where the piston 54 is forced upward (thus drawing in the propellant, air) by the action of a spring or some equivalent. Of course, the spring force must be overcome by the force of the pressurant 20 during the draining cycle.

Figure 11:
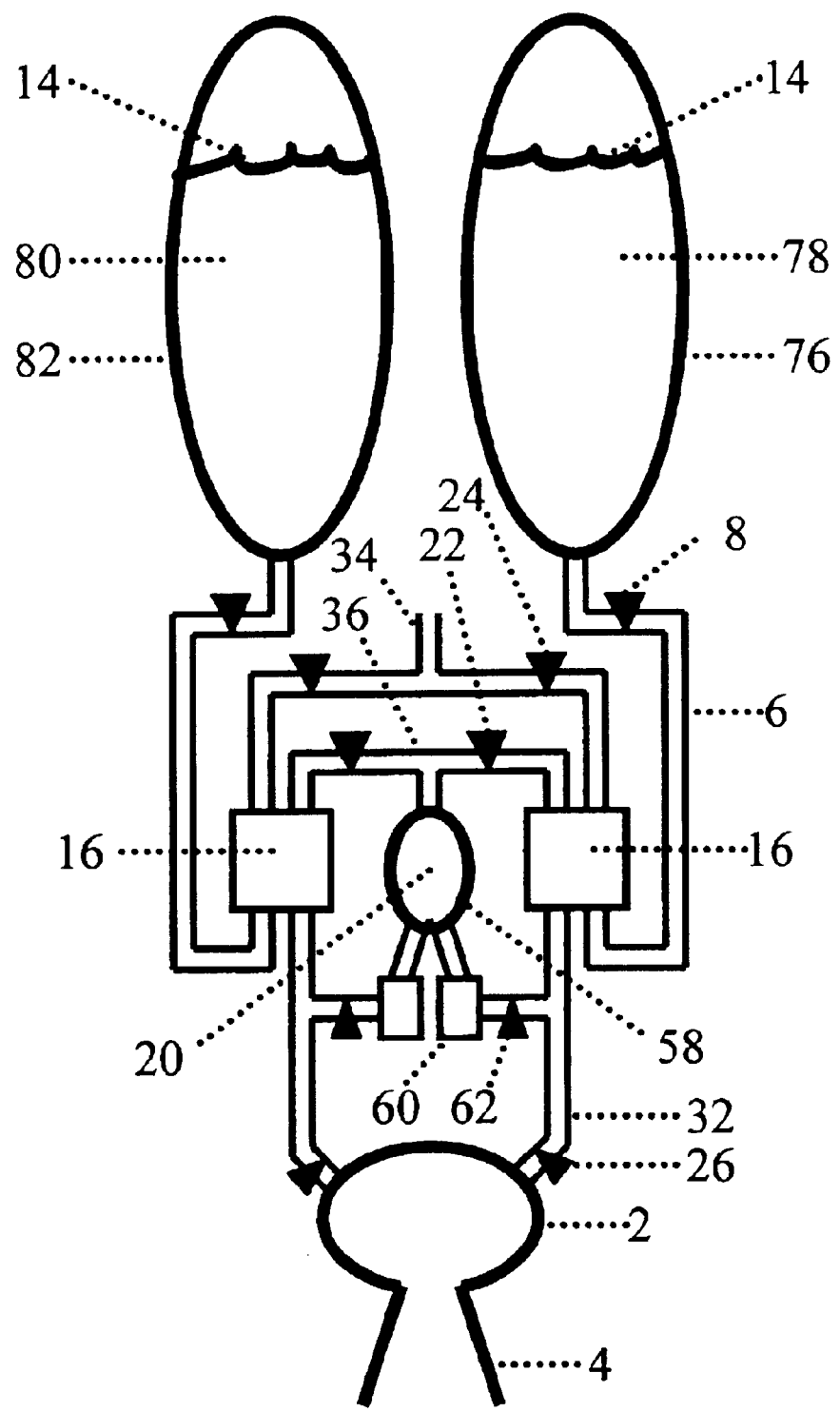
FIG. 11 shows a schematic view of a rocket engine system according to a preferred embodiment employing two propellants, a gas generator, and gas generator pumps.
Figure 12:
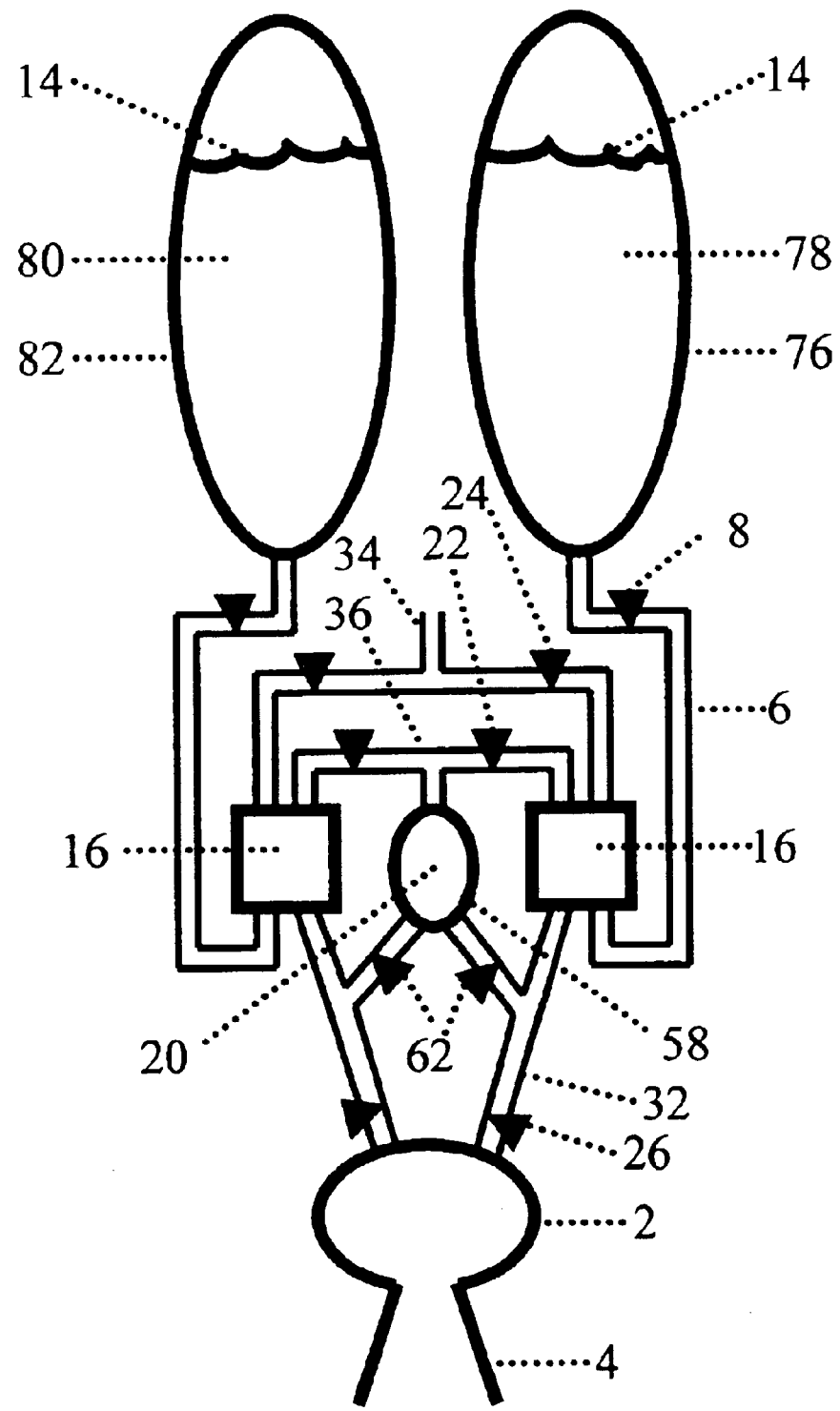
FIG. 12 shows a schematic view of a rocket engine system according to a preferred embodiment employing two propellants, a gas generator, and a pressurizer having differential pistons.

Referring now to FIGS. 11 and 12, another preferred embodiment of the present invention is a rocket engine system having a gas generator 58. A gas generator may simply be a device that produces high pressure gas from a liquid propellant. For example, in the embodiment shown in FIG. 5, the pressurant tank 18 coupled with the heating element 66 and/or heat conductive lead 68 may serve as a gas generator system, because the heating element 66 heats a liquid (such as liquid nitrogen) to create a high-pressure pressurant (such as nitrogen vapor of the liquid nitrogen). However, the gas generator 58 shown in FIG. 11 is more analogous to the gas generator system depicted in FIG. 6, in which the gas generator 58 creates high pressure pressurant 20 by combusting an oxidizer and a fuel together. The embodiment shown in FIG. 11 includes a gas generator 58, gas generator pumps 60, and gas generator valves 62. In this system, a small quantity of high pressure oxidizer 80 and fuel 78 (pumped from their respective pressurizers 16 to engine 2 via their respective engine conduits 32) is tapped from engine conduits 32 and passes to gas generator pumps 60 through gas generator valves 62. The fuel 78 and oxidizer 80 are then pumped into gas generator 58 and combusted, where hot high-pressure pressurant 20 is generated and fed to pressurizers 16. Pumps 60 are necessary because, where each storage tank 38 includes a regular (non-differential) piston 50 or 52 or membrane 48, the outlet pressure of each pressurizer 16 (i.e., the pressure of propellant 78, 80 flowing to the engine 2) is lower than the inlet pressure of each pressurizer (i.e., the pressure of pressurant 20 flowing from the gas generator 58). Therefore, to induce a flow of propellant 78, 80 from the pressurizer 16 back into the gas generator 58, gas generator pumps 60 are necessary. The pumps may be driven by a turbine or other engine, as would be obvious to one skilled in the art. Referring to FIG. 12, where each storage tank 38 includes differential pistons 54 as shown in FIGS. 4*c* and 4*d*, the gas generator pumps 60 may be eliminated, because the outlet of the pressurizer 16 has a pressure higher than its inlet.

Figure 13A:
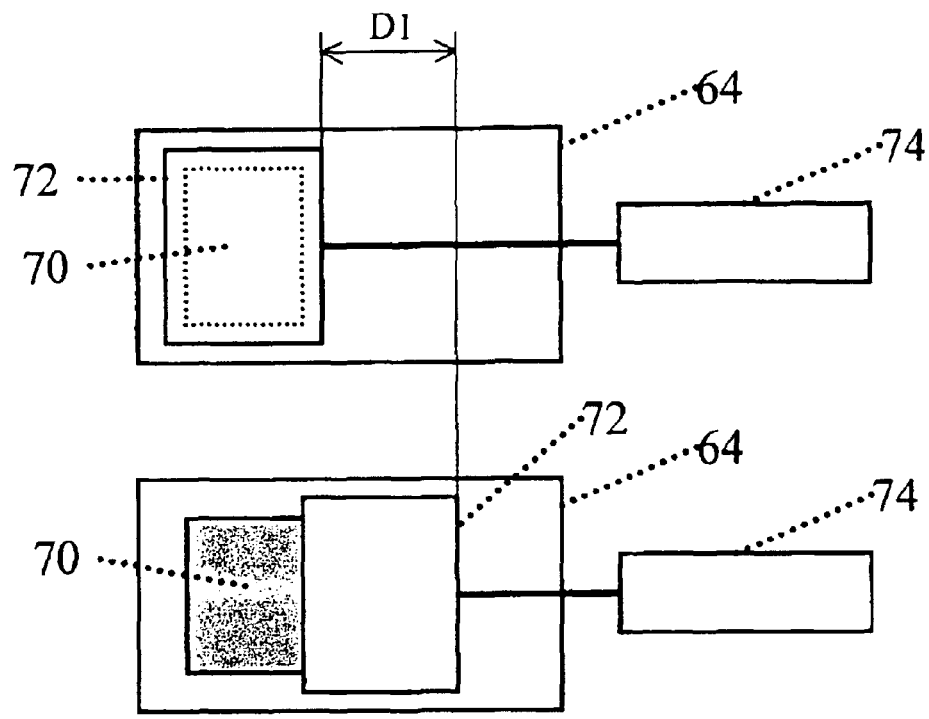
FIG. 13a shows a schematic view of a plate valve having a single flow hole.

FIG. 13*a* shows the closed and open configuration of a typical plate valve 64 having a flow hole 70, a valve plate 72, and a solenoid 74 connected by a linkage to the plate 72. The solenoid 74 is an electrical device that, depending on the current fed to it, will push or pull the valve plate 72 to close or open the valve 64, respectively. When the valve 64 is open (as shown in the bottom of FIG. 13*a*), fluid may flow through the flow hole 70. When the valve 64 is closed (as shown in the top of FIG. 13*a*), fluid flow through the flow hole 70 is restricted or entirely prevented. In a preferred embodiment, the direction of flow is in a direction perpendicular to the page, into the page. Thus, when the valve 64 is closed (i.e., the valve plate 72 is completely covering the flow hole 70), a pressure differential across the valve plate 72 pushes the valve plate 72 tightly against the valve 64, thus reducing or entirely preventing any flow or leakage of the fluid through the flow hole 70. To fully open the valve 64, the valve plate 72 must move a distance D1, as shown in FIG. 13*a*. Because the valve plate 72 has mass, this motion requires energy.

The faster the motion (i.e., the quicker the valve 64 can open and close), the more energy required to accelerate the mass. Further, because of the contact between the valve plate 72 and the surface of the valve 64, there is frictional energy dissipation when the valve 64 is opened and closed. This dissipation increases as the distance D1.

Figure 13B:
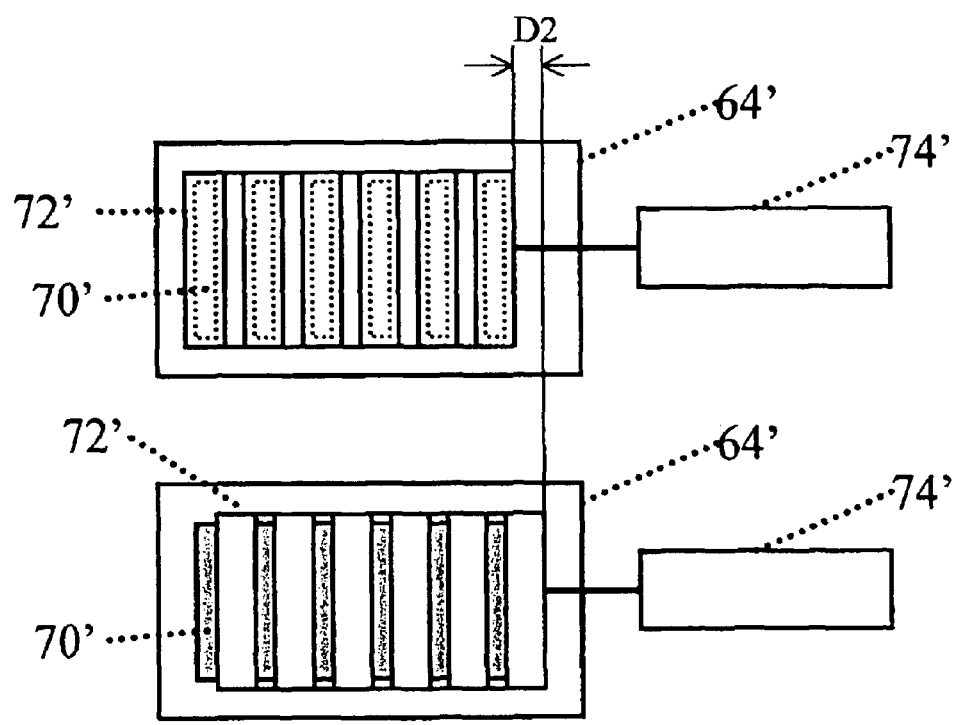
FIG. 13b shows a schematic view of a plate valve having a plurality of flow holes.

FIG. 13*b* shows a plate valve 64' according to a preferred embodiment. Plate valve 64' includes a plurality of flow holes 70', a valve plate 72', and a solenoid 74' connected to the valve plate 72'. Valve plate 72' has a series of slots, corresponding to the width of each of the flow holes 70'. Valve 64' in FIG. 13*b* is very similar to the valve 64 in FIG. 13*a* (e.g., the total flow area of all flow holes 70' in FIG. 13*b* is equal to the flow area of flow hole 70 in FIG. 13*a*). A substantial difference, however, is that the valve plate 72' need move only a distance D2 (as shown in FIG. 13*b*) in order to provide the same flow hole area provided by the valve 64 shown in FIG. 13*a*. Therefore, the energy required to accelerate the mass of the valve plate 72' a distance D2, given a particular cycle time, is less than the energy required to accelerate the mass of valve plate 72 a distance D1. Further, the total frictional power dissipation is less when moving valve plate 72' a distance D2 than when moving valve plate 72 a distance D1. Thus, solenoid 74' in FIG. 13*b* need not be as powerful as solenoid 74 in FIG. 13*a*, so the total mass of valve 64' is less than valve 64. Valve 64' need not be a plate valve.

Figure 15A:
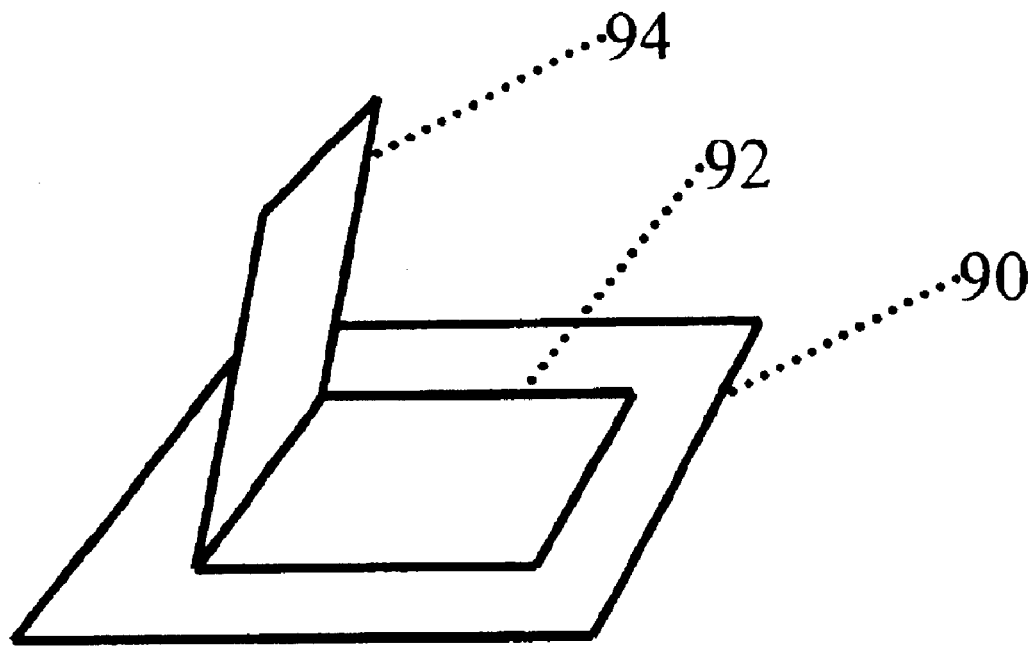
FIG. 15a shows a schematic view of a check valve having a single flow hole.
Figure 15B:
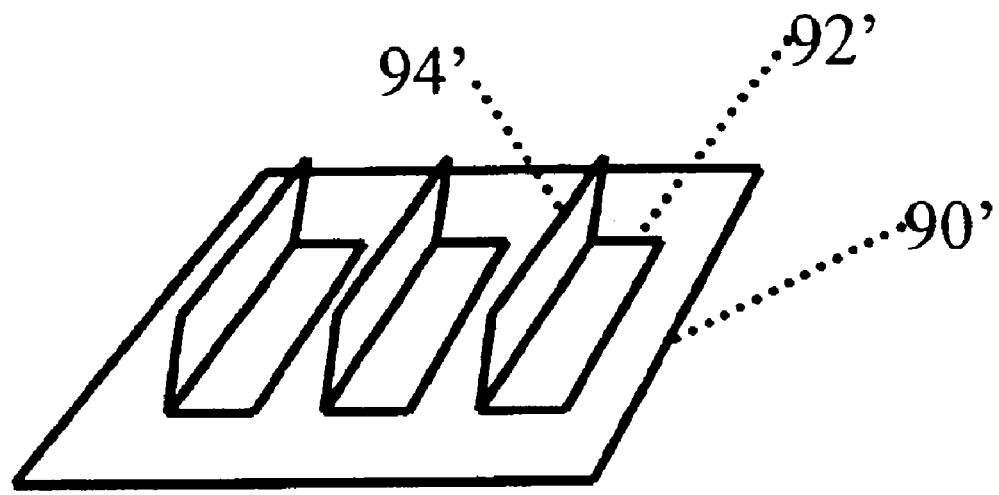
FIG. 15b shows a schematic view of a check valve having a plurality of flow holes.

A similar benefit of using many small flow holes instead of one large flow hole is shown with respect to FIGS. 15*a* and 15*b*. FIG. 15*a* shows a conventional check valve 90 having a flow hole 92 and a valve plate 94. Valve plate 94 is hinged and opens and closes in a direction approximately parallel to the flow of fluid through the flow hole 92. In FIGS. 15*a* and 15*b*, the valve 90, 90' is open, thus allowing fluid to pass through in an upward direction. If the fluid began, instead, to flow downward, the hinged valve plate 94 would be accelerated downward by the fluid flow until the valve plate 94 reached the surface of the valve 90, where the valve plate 94 would stop and further downward fluid flow would be stopped. FIG. 15*b* shows a check valve 90' having a plurality of flow holes 92', each flow hole having a hinged valve plate 94' that acts similarly to the valve plate 94 in FIG. 15*a*. As in the analysis of FIGS. 13*a* and 13*b*, the distance that valve plates 94' must traverse to fully open the check valve 90' is substantially less than the distance that valve plate 94 must traverse to fully open the check valve 90. Thus, for a given application, the check valve 90' in FIG. 15*b* has a much faster open and close time than the check valve 90 in FIG. 15*a*. Use of the improved valves 64' and 90' of FIGS. 13*b* and 15*b*, respectively, help to reduce the opening and closing time of the valves 40–46 in FIG. 2, and thus help to reduce total cycle time. These embodiments are offered only as examples, and any ultrafast valve equivalent is within the scope of this invention.

Figure 14:
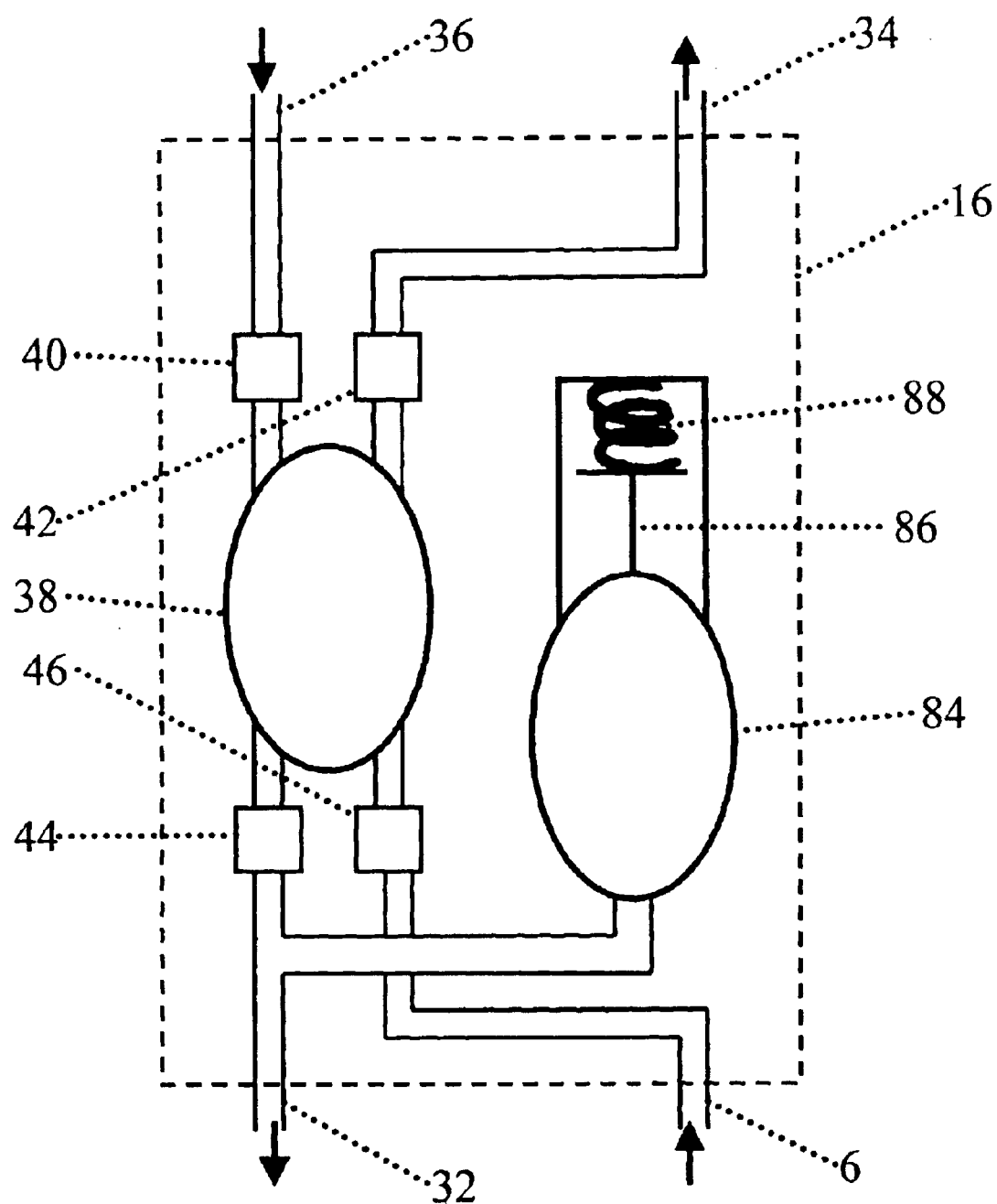
FIG. 14 shows a schematic view of a preferred embodiment of a pressurizer having a single storage tank and an accumulator.

FIG. 14 shows an alternative embodiment of pressurizer 16. Pressurizer 16 includes a single storage tank 38 with corresponding valves 40–46, as in FIG. 2, as well as an accumulator 84 having a piston 86 and a spring 88. The storage tank 38 and its valves 40–46 operate as previously described, having a filling cycle and a draining cycle in a total cycle. The accumulator 84 has a fluid connection to the engine conduit 32. The piston 86 (which extends inside the accumulator 86) exerts a force on propellant 12 inside the accumulator 86 by the action of the spring 88. By adjusting the spring constant of the spring 88, an approximately constant force may be applied to the propellant 12 inside the engine conduit 32, thus providing an approximately constant pressure and propellant flow to the engine 2. In the embodiment shown in FIG. 14, because storage tank 38 is only draining propellant 12 to the engine 2 for a portion of the total cycle (i.e., the draining cycle), the accumulator 84 drains propellant 12 to the engine 2 while the storage tank 38 is filling in the filling cycle. So that accumulator 84 contains sufficient propellant 12 to drain to the engine 2 during the entire filling cycle of the storage tank 38, storage tank 38 must be large enough so that, during the draining cycle, the storage tank 38 provides sufficient propellant flow to the engine 2, as well as sufficient propellant flow to completely fill the accumulator 84 with propellant 12. The embodiment shown in FIG. 14 has some advantages: a) the system is simpler because only a single storage tank with associated valves are needed; b) the accumulator 84 provides smoothing of the propellant flow without the need of an additional accumulator (which may be needed, anyway, in the embodiment shown in FIG. 2). The piston 86 and spring 88 combination could, of course, be anything that provides a desired force against the propellant 12. For example, accumulator 84 could contain a movable membrane, such as the one shown in FIG. 3, and the force could be applied to the propellant 12 through the membrane by the action of a high-pressure gas or hydraulic fluid. Further, the pressure exerted on the propellant 12 in the engine conduit 32 could be adjusted as desired by a feedback and control system (not shown), by adjusting the pressure of the high-pressure gas or hydraulic fluid. Many other means for implementing an accumulator 84 will be obvious to one skilled in the art.

Figure 16A:
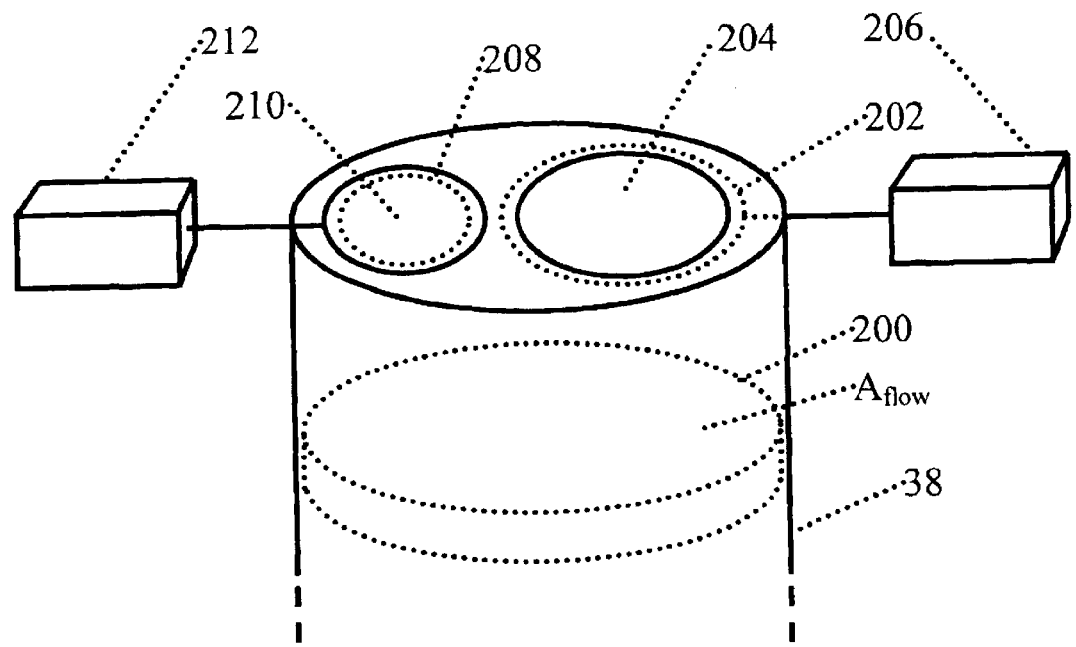
FIG. 16a shows a perspective view of a storage tank according to a preferred embodiment, showing pressurant entrance and exit holes.
Figure 16B:
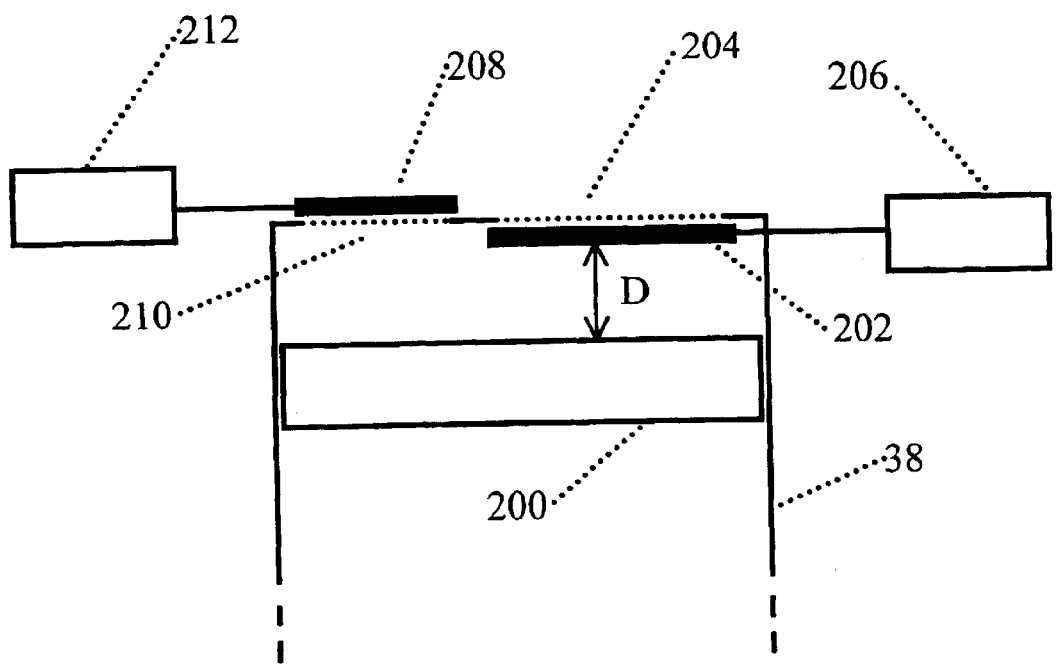

FIGS. 16*a* and 16*b* show a preferred embodiment of the upper portion of a storage tank shown in FIGS. 4*a*–4*d*. A storage tank 38 comprises a piston 200 (which could, for example, be membrane 48, short piston 50, long piston 52, differential piston 54, or any other suitable movable partition), pressurant exit hole 204, a pressurant exit valve having a valve plate 202 and a solenoid 206, pressurant entrance hole 210, and a pressurant entrance valve having a valve plate 208 and a solenoid 212. For simplicity in the figures, pressurant exit and entrance holes 204, 210 and pressurant exit and entrance valve plates 202, 208 are shown as if there is only one pressurant exit and entrance hole 204, 210 each. However, in a preferred embodiment, there may be a plurality of pressurant exit and entrance holes 204, 210 each, as in the valve embodiment shown in FIG. 13*b*. In the embodiment shown in FIG. 16*b*, pressurant exit valve plate 202 is inside storage tank 38 because the pressure inside the storage tank 38 is always at least as high (and usually much higher) than the pressure on the other side of the pressurant exit valve plate 202, so this pressure serves to press the plate 202 against its sealing surface to create a good seal. Similarly, the pressurant entrance valve plate 208 is outside of the storage tank 38 because the pressure inside the storage tank 38 is always equal to or lower (and usually much lower) than the pressure on the other side of the pressurant entrance valve plate 208, so this pressure serves to press the plate 208 against its sealing surface to create a good seal. Not shown in FIGS. 16*a* and 16*b*, of course, are the pressurant conduit 36 (which would be connected to the storage tank 38 above the pressurant entrance hole 210) and exhaust conduit 34 (which would be connected to the storage tank 38 above the pressurant exit hole 204).

FIG. 16*b* shows a shortest flow distance D between the pressurant exit valve plate 202 and the piston 200. (Where no membrane or piston 200 is used at all, the distance D is the shortest flow distance between the pressurant exit valve plate 202 and the meniscus of the propellant 12. Further, the shortest flow distance is defined by the movable valving member of the pressurant exit valve, whether or not the movable valving member happens to be a valve plate 202.) This distance, when the piston (or meniscus) is at its highest point (i.e., corresponding to the point at which the storage tank 38 is completely filled with propellant 12) should be minimized, because the volume defined by the cross sectional area of the storage tank 38 and this minimum distance D is a dead volume which is filled with pressurant 20 during the draining cycle and which is depressurized during the filling cycle. However, this dead volume does not contribute to the displacement of propellant 12 inside storage tank 38. Therefore, in every complete cycle, this dead volume is pressurant 20 is effectively disposed of without any benefit. Further, not only is the mass of this pressurant 20 disposed of without benefit (a severe problem in rocket applications), but it also takes additional time for the this dead pressurant volume to depressurize before the storage tank 38 can be filled with propellant 12. This additional time increases the achievable cycle time of the system, which increases its mass. Minimizing this loss can be achieved by minimizing the shortest flow distance between the pressurant exit valve plate 202 and the piston 200 when the storage tank 38 is fully filled, particularly in relation to the shortest flow distance between the pressurant exit valve plate 202 and the piston 200 when the storage tank 38 is fully drained. By way of example but not limitation, the shortest flow distance between the pressurant exit valve plate 202 and the piston 200 when the storage tank 38 is fully filled may be less than one-half (or one-fourth or one-tenth, etc.) the shortest flow distance between the pressurant exit valve plate 202 and the piston 200 when the storage tank 38 is fully drained. Further, minimizing this loss can also be achieved by minimizing the shortest flow distance between the pressurant entrance valve plate 208 and the piston 200 when the storage tank 38 is fully filled, particularly in relation to the shortest flow distance between the pressurant entrance valve plate 208 and the piston 200 when the storage tank 38 is fully drained.

In FIGS. 16*a* and 16*b*, the pressurant entrance and exit valves are effectively built-in to the storage tank 38, and the valve surfaces (against which the valve plates 202, 208 rest) may have a unitary construction with the storage tank 38, or the equivalent. In this embodiment, there is effectively no conduit between the storage tank 38 and the pressurant entrance and exit valves. Other means for achieving the same benefit (i.e., for reducing the minimum distance between the movable valving member of each of the pressurant entrance and exit valves and the upper surface of the piston 200 when the storage tank 38 is fully filled) are within the scope of the invention.

FIG. 16*a* shows that the piston 200 has a surface area that is approximately equal to the cross sectional flow area $A_{flow}$ of the storage tank 38. In order to depressurize the pressurant from the storage tank 38 very quickly before the storage tank 38 begins to fill with propellant 12, the cross sectional area of the pressurant exit hole 204 should be large in relation to $A_{flow}$. For example, the pressurant exit hole 204 may have a cross sectional flow area that is at least one-tenth the cross sectional flow area $A_{flow}$ of the storage tank 38. By decreasing the depressurization time in the above ways (reducing the dead volume of high-pressure pressurant and by increasing the cross sectional flow area of the pressurant exit valve), the total cycle time and corresponding pressurizer mass can be reduced. Similarly, the storage tank 38 can fill and drain of propellant 12 very quickly where the total flow cross sectional area of each of the propellant entrance and propellant exit valves are large (e.g., at least one-fourth) compared to the cross sectional flow area $A_{flow}$ of the storage tank 38.

The above two embodiments (i.e., reducing the minimum distance between the movable valving member of each of the pressurant entrance and exit valves and the upper surface of the piston 200 when the storage tank 38 is fully filled, and increasing the total cross sectional flow area of the propellant exit valve in relation to the cross sectional flow area $A_{flow}$ of the storage tank 38) may be combined into another embodiment. For example, many of the benefits of the present invention may be achieved where the total cross sectional flow area of the pressurant exit valve is large in comparison to the shortest flow distance between the pressurant exit valve plate 202 (or other movable valving member of the pressurant exit valve) and the piston 200 (or other separator or propellant meniscus) when the storage tank 38 is fully filled. For example, a characteristic diameter of the pressurant exit valve (such as the square root of the of the total cross sectional flow area of the pressurant exit valve) may be greater than the shortest flow distance between the pressurant exit valve plate 202 (or other movable valving member of the pressurant exit valve) and the piston 200 (or other separator or propellant meniscus) when the storage tank 38 is fully filled. As another example, the characteristic diameter of the pressurant exit valve may be greater than ten times the shortest flow distance between the pressurant exit valve plate 202 and the piston 200 when the storage tank 38 is fully filled. Utilizing one or more of the above embodiments may allow the cycle time of each storage tank 38 to be driven very low, such as below 500 milliseconds, 250 ms, or 100 ms. However, as the cycle time is pushed lower and lower, the size and mass of the storage tanks 38 also gets lower, causing the average fill and drain velocities inside each storage tank 38 to increase in order to maintain a constant propellant flow rate. Because additional pressurant 20 is required to accelerate the propellant 12 to higher and higher average drain velocities, there may be an optimized cycle time, such that a shorter cycle time actually increases the mass of the pressurizer system, because the increase in pressurant mass necessary to drain the propellant 12 faster may overcome the decrease in storage chamber mass due to a shorter cycle time. Thus, in a preferred embodiment, the cycle time is greater than 1 ms.

FIGS. 17a and 17b show other preferred embodiments of the present invention. In FIG. 17a, two storage tanks 38 (an upper and a lower), each having a differential piston 54, are connected back-to-back so that differential pistons 54 are connected by a connecting rod 214. Further, the storage tanks 38 are oriented so that the higher-pressure region (i.e., the region containing propellant 12) of the upper storage tank 38 is the lower region of the upper storage tank 38, and the higher-pressure region of the lower storage tank 38 is the upper region of the bottom storage tank 38. The two storage tanks 38 are divided by a separator 216 having a hole through which connecting rod 214 may pass. There is a very tight clearance between the connecting rod 214 and the hole in the separator 216, and preferably the hole in the separator 216 has piston rings, to prevent leakage of propellant 12 from the higher pressure region of the upper storage tank 38 to the higher pressure region of the lower storage tank 38, and vice versa. Details of the propellant entrance and exit valves of each of the storage tanks 38 has been left out, because these details have been discussed, e.g., with reference to FIGS. 16a and 16b. Two propellant entrance valves, one for the higher pressure region of each storage tank 38, are designated as propellant entrance check valves 218, and two propellant exit valves, one for the higher pressure region of each storage tank 38, are designated as propellant exit check valves 220. Because of this connection via connecting rod 214, the cycles of the two storage tanks 38 are offset by exactly half a cycle. An advantage of this embodiment is that, during the draining cycle of one storage tank 38, the differential piston 54 of the other storage tank 38 is immediately forced in the filling direction (i.e., before the pressure of the propellant 12 from the propellant tank 10 would normally push the piston 54 in the filling direction). This has the effect of pushing the residual high-pressure pressurant 20 more quickly than then the pressurant 20 would naturally depressurize. Thus, the depressurization time is reduced, with a corresponding reducing in cycle time and pressurizer mass. FIG. 17b shows a similar embodiment where each storage tank 38 has a short piston 50 (instead of a differential piston 54), and the short pistons 50 are connected by connecting rod 214 through separator 216.

Figure 18:
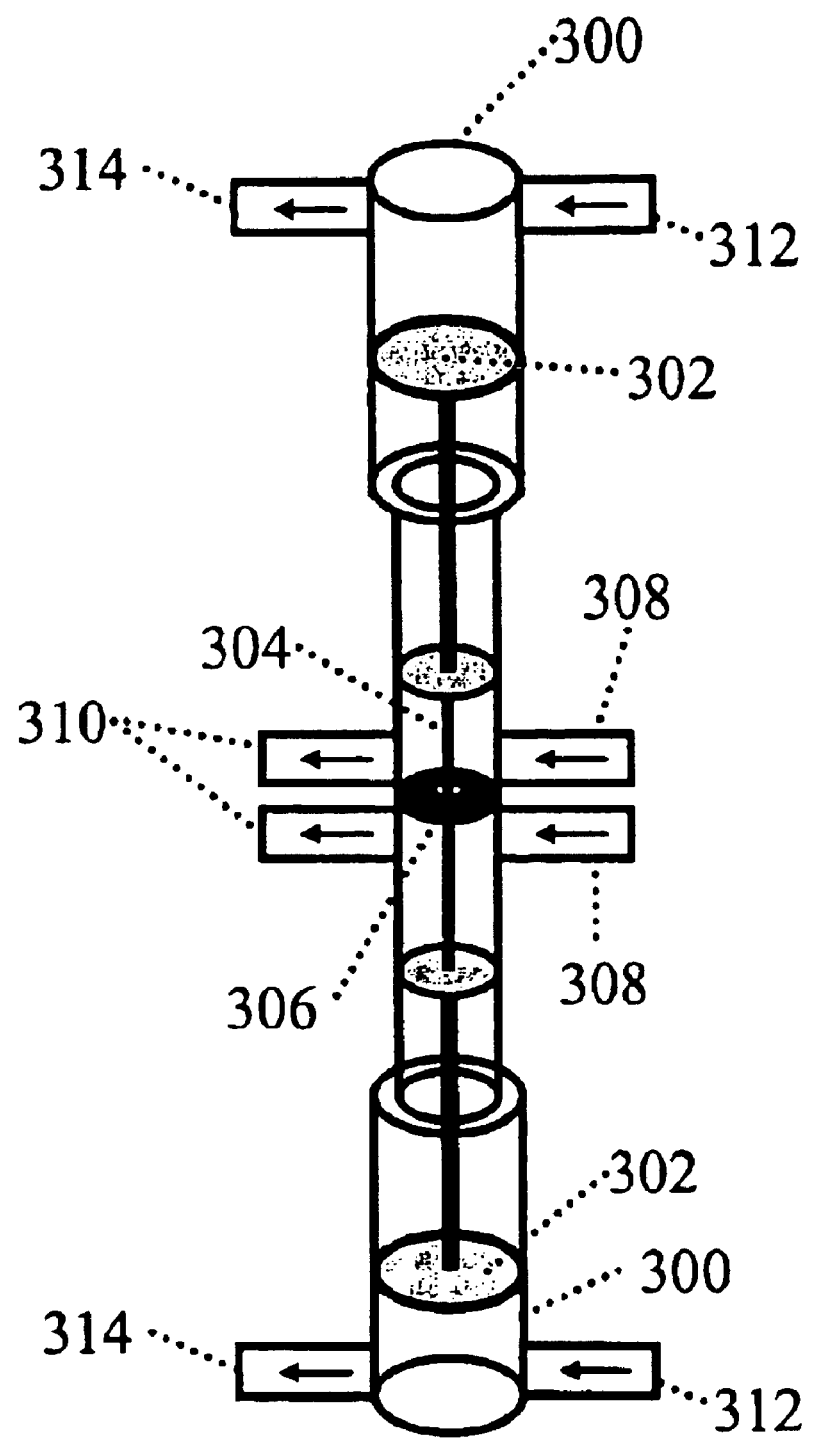
FIG. 18 shows a perspective view of a pressurizer according to another embodiment.

FIG. 18 shows another embodiment of the present invention. Two storage tanks 300 (an upper and a lower), each having a differential piston 302, are connected back-to-back so that differential pistons 302 are connected by a connecting rod 304. Further, the storage tanks 300 are oriented so that the higher-pressure region (i.e., the region containing propellant 12) of the upper storage tank 300 is the lower region of the upper storage tank 300, and the higher-pressure region of the lower storage tank 300 is the upper region of the lower storage tank 300. The two storage tanks 300 may be divided by a separator 306 having a hole through which connecting rod 304 may pass. There may be a very tight clearance between the connecting rod 304 and the hole in the separator 306, and the hole in the separator 306 may have piston rings, to prevent leakage of propellant 12 from the higher pressure region of the upper storage tank 300 to the higher pressure region of the lower storage tank 300, and vice versa. Each storage tank 300 may comprise a propellant entrance valve 308, a propellant exit valve 310, a pressurant entrance valve 312, and a pressurant exit valve 314. The propellant entrance and exit valves 308, 310 may be similar to propellant entrance and exit valves 218, 220 described with respect to FIGS. 17a and 17b. Pressurant entrance and exit valves 312, 314 may be any valves known in the art, and may or may not comprise the pressurant entrance and exit valves described with respect to FIGS. 16a and 16b (reference numbers 202, 204, 208, 210). For simplicity of explanation, arrows in FIG. 18 show a direction of movement of pressurant through pressurant entrance and exit valves 312, 314 (which in FIG. 18 are shown approximately perpendicular to the direction of motion of pistons 302), but the direction of movement of the pressurant through pressurant entrance and exit valves 312, 314 may be other than that shown, such as approximately parallel to the direction of motion of pistons 302).

Most of the embodiments described herein have represented simple versions for clarity of explanation. Needless to say, many of the features of the embodiments described herein may be "mixed and matched" to satisfy individual design requirements regarding cost, complexity, size, type of propellant 12 and pressurant 20, desired flow rate, and other factors.

The invention claimed is:

1. A pressurizer for pressurizing a fluid, comprising:
at least two storage tanks, wherein, for each storage tank, said pressurizer further comprises:
  a propellant entrance valve connected to and associated with said storage tank;
  a propellant exit valve connected to and associated with said storage tank;
  a pressurant entrance valve connected to and associated with said storage tank; and
  a pressurant exit valve connected to and associated with said storage tank,
wherein each of said storage tanks is configured to be filled with said fluid under a low pressure when its associated propellant entrance and pressurant exit valves are open and its associated propellant exit and pressurant entrance valves are closed, and to be drained of said fluid under a high pressure by the force of a pressurant when its associated propellant entrance and pressurant exit valves are closed and its associated propellant exit and pressurant entrance valves are open, wherein at least one of a)–g) is true:
a) for each storage tank, the associated pressurant exit valve comprises a plurality of separate flow holes and a movable valving member configured to restrict flow through the plurality of separate flow holes simultaneously;
b) for each storage tank, the associated propellant exit valve comprises a plurality of separate flow holes;
c) the associated pressurant exit valve for each storage tank comprises at least one flow hole and a movable valving member configured to restrict flow through the flow hole, wherein a shortest flow distance from the movable valving member to a meniscus of the fluid inside the storage tank when the storage tank is fully filled with the fluid is substantially less than a shortest flow distance from the movable valving member to a meniscus of the fluid inside the storage tank when the storage tank is fully drained of the fluid;
d) the associated pressurant exit valve for each storage tank comprises at least one flow hole and a movable valving member configured to restrict flow through the flow hole, wherein each storage tank comprises a movable partition configured to substantially separate the fluid from the pressurant during filling and draining, wherein a shortest flow distance from the movable valving member to a surface of the movable partition when the storage tank is fully filled with the fluid is less than approximately one-tenth a shortest flow distance from the movable valving member to the movable partition when the storage tank is fully drained of the fluid;
e) the associated pressurant exit valve for each storage tank comprises at least one flow hole and a movable valving member configured to restrict flow through the flow hole, wherein each storage tank comprises a movable partition configured to substantially separate the fluid from the pressurant during filling and draining, wherein a square root of a total flow cross sectional area of the associated pressurant exit valve is greater than ten times a shortest flow distance from the movable valving member to a surface of the movable partition when the storage tank is fully filled with the fluid;
f) the associated pressurant exit valve for each storage tank comprises at least one flow hole and a movable valving member configured to restrict flow through the flow hole, wherein each storage tank comprises a movable partition configured to substantially separate the fluid from the pressurant during filling and draining, wherein a square root of a total flow cross sectional area of the associated pressurant exit valve is greater than a shortest flow distance from the movable valving member to a surface of the movable partition when the storage tank is fully filled with the fluid; and
g) the pressurizer further comprises a movable partition inside each storage tank, configured to substantially separate the fluid from the pressurant, wherein the movable partition of a first storage tank is connected to the movable partition of a second storage tank, so that a pumping cycle of the first storage tank and a pumping cycle of the second storage tank are offset by half a pumping cycle.

2. An impulse reaction engine system, comprising:
an impulse reaction engine; and
the pressurizer as claimed in claim 1 connected to the impulse reaction engine.

3. The impulse reaction engine system as in claim 2, wherein at least one of h) and i) is true:

h) said associated pressurant exit valve for each storage tank comprises at least one flow hole and a movable valving member configured to restrict flow through said flow hole, wherein each storage tank comprises a movable partition configured to substantially separate said propellant from said pressurant during filling and draining, wherein a shortest flow distance from said movable valving member to a surface of said movable partition when said storage tank is fully filled with said propellant is substantially less than a shortest flow distance from said movable valving member to said movable partition when said storage tank is fully drained of said propellant; and
i) said associated pressurant exit valve for each storage tank has a total flow cross sectional area that is at least one-tenth of a maximum cross sectional area of said storage tank in a direction perpendicular to a flow direction of said propellant inside said storage tank.

4. The impulse reaction engine system as in claim 2, wherein at least three of a)–g) are true.

5. The impulse reaction engine system as in claim 2, further comprising:
a propellant tank configured to contain propellant at a low pressure; and
a gas generator configured to generate pressurant at a high pressure from liquid propellants,
wherein the pressurizer is configured to transfer propellant from the propellant tank at the low pressure to the impulse reaction engine at the high pressure in a substantially continuous flow.

6. The pressurizer as in claim 1, wherein at least two of a)–g) are true.

7. The pressurizer as in claim 1, wherein at least four of a)–g) are true.

8. The pressurizer as in claim 1, wherein a) is true.
9. The pressurizer as in claim 1, wherein b) is true.
10. The pressurizer as in claim 1, wherein c) is true.
11. The pressurizer as in claim 1, wherein d) is true.
12. The pressurizer as in claim 1, wherein e) is true.
13. The pressurizer as in claim 1, wherein f) is true.
14. The pressurizer as in claim 1, wherein g) is true.

15. A method of pumping a fluid, comprising:
providing the pressurizer as claimed in claim 1; and
for each storage tank, opening and closing its associated valves in cycles to sequentially fill and drain the storage tank of the fluid, the cycles each having a cycle time between approximately 1 and 500 milliseconds,
wherein the cycles of the associated valves of the storage tanks are out of phase with each other such that at some time in which one storage tank is being filled with the fluid, at least one other storage tank is being drained of the fluid.

16. A pressurizer for pressurizing a fluid, comprising:
a storage tank;
an accumulator;
a propellant entrance valve connected to said storage tank;
a propellant exit valve connected between said storage tank and said accumulator;
a pressurant entrance valve connected to said storage tank; and
a pressurant exit valve connected to said storage tank,
wherein said storage tank is configured to be filled with said fluid under a low pressure when said propellant entrance and pressurant exit valves are open and said propellant exit and pressurant entrance valves are closed, and to be drained of said fluid under a high pressure by the force of a pressurant when said propellant entrance and pressurant exit valves are closed and said propellant exit and pressurant entrance valves are open, wherein said accumulator is configured to provide a substantially continuous flow of said fluid at said high pressure by filling with said fluid when said storage tank is draining of said fluid, and by draining of said fluid when said storage tank is filling with said fluid, wherein at least one of a) and b) is true:

a) said pressurant exit valve comprises at least one flow hole and a movable valving member configured to restrict flow through said flow hole, wherein said storage tank comprises a movable partition configured to substantially separate said fluid from said pressurant during filling and draining, wherein a shortest flow distance from said movable valving member to a surface of said movable partition when said storage tank is fully filled with said fluid is substantially less than a shortest flow distance from said movable valving member to said movable partition when said storage tank is fully drained of said fluid; and b) said pressurant exit valve has a total flow cross sectional area that is at least one-tenth of a maximum cross sectional area of said storage tank in a direction perpendicular to a flow direction of said fluid inside said storage tank.

17. The pressurizer as in claim 16 wherein b) is true.

18. A method of pumping a fluid, comprising:

providing the pressurizer as claimed in claim 16; and opening and closing the valves in cycles to sequentially fill and drain the storage tank of the fluid, the cycles each having a cycle time between approximately 1 and 500 milliseconds.

19. The pressurizer as in claim 16, wherein a) is true.

20. A pressurizer for pressurizing a fluid, comprising:

at least one pressure vessel;

a piston movable in said at least one pressure vessel;

at least two pressurant entrance valves configured to be opened and closed out of phase with each other;

at least two pressurant exit valves configured to be opened and closed out of phase with each other;

at least two propellant entrance valves configured to be opened and closed out of phase with each other; and at least two propellant exit valves configured to be opened and closed out of phase with each other, wherein at least the at least two pressurant entrance valves and the at least two pressurant exit valves are connected to said at least one pressure vessel, wherein said pressurizer is configured to be filled with said fluid under a low pressure and to be drained of said fluid under a high pressure by the force of a pressurant, wherein the pressurizer is configured to be filled with said fluid and drained of said fluid substantially simultaneously so as to deliver a substantially continuous flow of said fluid, wherein the piston comprises at least two piston portions connected by a connecting rod, wherein at least one of the at least two piston portions is reciprocating movable alone a substantially linear segment, wherein at least one of the pressurant exit valves comprises at least one flow hole and a movable valving member configured to restrict flow through the flow hole, and wherein at least one of a) and f) is true:

a) a shortest flow distance from said movable valving member to a surface of said at least one of said piston portions when located at one end of said linear segment is less than approximately one-tenth a shortest flow distance from said movable valving member to said at least one of said piston portions when located at an opposite end of said linear segment; and b) a square root of a total flow cross sectional area of said at least one of said pressurant exit valves is substantially greater than a shortest flow distance from said movable valving member to a surface of said at least one of said piston portions when located at a proximal end of said linear segment.

21. An impulse reaction engine system, comprising:

an impulse reaction engine; and the pressurizer as claimed in claim 20 connected to said impulse reaction engine.

22. The impulse reaction engine system as in claim 21, wherein the piston comprises a differential piston and wherein the pressurant is generated at least in part by the impulse reaction engine.

23. A method of pumping a fluid, comprising:

providing the pressurizer as claimed in claim 20; and opening and closing the at least two pressurant entrance valves, the at least two pressurant exit valves, the at least two propellant entrance valves, and the at least two propellant exit valves in cycles to sequentially fill and drain the pressurizer of the fluid, the cycles each having a cycle time between approximately 1 and 500 milliseconds.

24. The pressurizer as in claim 20, wherein a) is true.

25. The pressurizer as in claim 20, wherein b) is true.

26. An impulse reaction engine system, comprising:

an impulse reaction engine;

a propellant tank configured to contain propellant at a low pressure; and a pressurizer configured to transfer propellant from the propellant tank at the low pressure to the impulse reaction engine at a high pressure in a substantially continuous flow, wherein at least one of a) and b) is true:

a) the pressurizer comprises:

at least two storage tanks, wherein, for each storage tank, the pressurizer further comprises:

a propellant entrance valve connected to and associated with the storage tank;

a propellant exit valve connected to and associated with the storage tank;

a pressurant entrance valve connected to and associated with the storage tank; and a pressurant exit valve connected to and associated with the storage tank, wherein each of the storage tanks is configured to be filled with the propellant under a low pressure when its associated propellant entrance and pressurant exit valves are open and its associated propellant exit and pressurant entrance valves are closed, and to be drained of the propellant under a high pressure by the force of a pressurant when its associated propellant entrance and pressurant exit valves are closed and its associated propellant exit and pressurant entrance valves are open; and b) the pressurizer comprises:

at least one pressure vessel;

a piston movable in the at least one pressure vessel;

at least two pressurant entrance valves configured to be opened and closed out of phase with each other;

at least two pressurant exit valves configured to be opened and closed out of phase with each other;

at least two propellant entrance valves configured to be opened and closed out of phase with each other; and at least two propellant exit valves configured to be opened and closed out of phase with each other, wherein at least the at least two pressurant entrance valves and the at least two pressurant exit valves are connected to the at least one pressure vessel, wherein the pressurizer is configured to be filled with the propellant under a low pressure and to be drained of the propellant under a high pressure by the force of a pressurant, and wherein the pressurizer is configured to be filled with the propellant and drained of the propellant substantially simultaneously so as to deliver a substantially continuous flow of the propellant.

27. A method of operating an impulse reaction engine system, comprising:

providing the impulse reaction engine system as claimed in claim 26;

if a) is true, then, for each storage tank, opening and closing its associated valves in cycles to sequentially fill and drain the storage tank of the propellant, the cycles each having a cycle time between approximately 1 and 500 milliseconds; and if b) is true, opening and closing the at least two pressurant entrance valves, the at least two pressurant exit valves, the at least two propellant entrance valves, and the at least two propellant exit valves in cycles to sequentially fill and drain the pressurizer of the propellant, the cycles each having a cycle time between approximately 1 and 500 milliseconds.

* * * * *